(12) United States Patent
Kim et al.

(10) Patent No.: US 9,866,410 B2
(45) Date of Patent: Jan. 9, 2018

(54) METHOD AND APPARATUS FOR CHANNEL ESTIMATION AND EQUALIZATION IN QAM-FBMC SYSTEM

(71) Applicants: Samsung Electronics Co., Ltd., Suwon-si, Gyeonggi-do (KR); Industry-Academic Cooperation Foundation, Yonsei University, Seoul (KR)

(72) Inventors: Seonghyun Kim, Seoul (KR); Beom Kwon, Seoul (KR); Sanghoon Lee, Seoul (KR); Hojae Lee, Gimpo-si (KR); Taeyoung Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 77 days.

(21) Appl. No.: 14/840,666

(22) Filed: Aug. 31, 2015

(65) Prior Publication Data

US 2016/0065390 A1 Mar. 3, 2016

(30) Foreign Application Priority Data

Aug. 29, 2014 (KR) .................. 10-2014-0114120
Jan. 8, 2015 (KR) .................. 10-2015-0002924

(51) Int. Cl.
*H04K 1/10* (2006.01)
*H04L 27/28* (2006.01)
(Continued)

(52) U.S. Cl.
CPC ........ *H04L 25/0224* (2013.01); *H04L 25/022* (2013.01); *H04L 25/03159* (2013.01); *H04L 27/264* (2013.01); *H04L 5/0051* (2013.01)

(58) Field of Classification Search
CPC .............. H04L 5/0048; H04L 25/0232; H04L 25/0224; H04L 25/022; H04L 25/03159; H04L 27/264; H04B 2201/70701
See application file for complete search history.

(56) References Cited

U.S. PATENT DOCUMENTS

| 8,761,280 B1* | 6/2014 | Harris | ................. H04L 27/2602 375/259 |
| 2003/0128656 A1* | 7/2003 | Scarpa | ................. H04L 25/0236 370/203 |

(Continued)

FOREIGN PATENT DOCUMENTS

WO 2012-081870 A2 6/2012

*Primary Examiner* — Chieh M Fan
*Assistant Examiner* — Sung Ahn
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method and apparatus for channel estimation and equalization in a cellular environment based on quadrature amplitude modulation-filter bank multicarrier (QAM-FBMC) transmission is provided. The signal transmission method for a transmitter includes sending channel measurement information to a receiver, receiving channel related information from the receiver, selecting a first filter and a second filter to be used for signal transmission according to the received channel related information, mapping, when no performance difference is present between the first filter and the second filter, reference symbols evenly to subcarriers associated with the first filter and subcarriers associated with the second filter, mapping, when a performance difference is present between the first filter and the second filter, reference symbols preferentially to subcarriers associated with the transmitting (Continued)

filter with higher performance, and sending a transmit signal having the mapped reference symbols.

28 Claims, 22 Drawing Sheets

(51) Int. Cl.
  *H04L 25/02* (2006.01)
  *H04L 27/26* (2006.01)
  *H04L 25/03* (2006.01)
  *H04L 5/00* (2006.01)

(56) References Cited

U.S. PATENT DOCUMENTS

| | | | |
|---|---|---|---|
| 2005/0238108 A1* | 10/2005 | Suh | H04L 1/0001 375/260 |
| 2012/0063410 A1 | 3/2012 | Hong et al. | |
| 2012/0250558 A1 | 10/2012 | Chung et al. | |
| 2012/0269234 A1* | 10/2012 | Zhang | H04L 5/0007 375/143 |
| 2013/0272448 A1 | 10/2013 | Moon et al. | |
| 2014/0023001 A1* | 1/2014 | Huang | H04W 24/02 370/329 |
| 2014/0133329 A1* | 5/2014 | Ji | H04L 1/0023 370/252 |
| 2014/0169501 A1* | 6/2014 | Nazarathy | H03H 17/0266 375/316 |

* cited by examiner

METHOD AND APPARATUS FOR CHANNEL ESTIMATION AND EQUALIZATION IN QAM-FBMC SYSTEM

CROSS-REFERENCE TO RELATED APPLICATION(S)

This application claims the benefit under 35 U.S.C. §119 (a) of a Korean patent application filed on Aug. 29, 2014 in the Korean Intellectual Property Office and assigned Serial number 10-2014-0114120, and of a Korean patent application filed on Jan. 8, 2015 in the Korean Intellectual Property Office and assigned Serial number 10-2015-0002924, the entire disclosure of each of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD., and 2) INDUSTRY-ACADEMIC COOPERATION FOUNDATION, YONSEI UNIVERSITY.

TECHNICAL FIELD

The present disclosure relates to channel estimation and equalization in a cellular environment based on quadrature amplitude modulation (QAM)-filter bank multi-carrier (FBMC) transmission techniques. More particularly, the present disclosure relates to a method and apparatus whereby a reference symbol (RS) is mapped to a subcarrier passing through two different filters and channel estimation is performed using the RS for each filter and equalization is performed using the estimated channel information.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

For channel estimation, the transmitter and receiver share mutually agreed information. The receiver performs channel estimation based on such shared information. Schemes for channel estimation may be based on preambles or scattered reference symbols (scattered RSs). In embodiments of the present disclosure, channel estimation schemes based on scattered reference symbols are considered.

FIG. 1 illustrates a structure of subcarrier-reference symbol mappings for channel estimation based on scattered reference symbols in the quadrature amplitude modulation-orthogonal frequency division multiplexing (QAM-OFDM) system according to the related art.

Channel estimation based on scattered reference symbols for the QAM OFDM system is used in a cellular environment such as long term evolution (LTE).

Referring to FIG. 1, RS 110 is mapped to a particular subcarrier on a periodic basis so that channel information for the subcarrier is estimated. The channel information for all the subcarriers may be estimated through interpolation from the channel information estimated for the subcarrier.

FIG. 2 illustrates a structure of subcarrier-reference symbol mappings for channel estimation based on scattered reference symbols in the offset quadrature amplitude modulation (OQAM) OFDM system according to the related art.

Referring to FIG. 2, for channel estimation based on scattered reference symbols in a transmission system using OQAM and filters, auxiliary pilot 230 is used together with RS 210 to remove interference affecting RS 210 from neighboring subcarriers and symbols. Channel information at the position of RS 210 is estimated by using both RS 210 and auxiliary pilot 230, and the channel information for all the subcarriers may be estimated through interpolation from the channel information estimated at RS 210.

Owing to characteristics of transmitter and receiver filters in a cellular environment based on QAM filter bank multi-carrier (FBMC) transmission, existing schemes for scattered RS based channel estimation applied to a cellular environment based on QAM-OFDM transmission like LTE are not readily applicable to the cellular environment based on QAM-FBMC transmission. As such, equalization performance may also be degraded.

Schemes for scattered RS based channel estimation applied to a cellular environment based on OQAM-OFDM transmission where one filter is used in the transmitter and receiver are not readily applicable to a cellular environment based on QAM-FBMC transmission where signal detection is performed differently from that for the OQAM-OFDM system and two different filters are used. In addition, schemes for scattered RS based channel estimation applied to the cellular environment based on OQAM-OFDM transmission uses auxiliary pilots besides RSs to estimate channel information for RSs, reducing frequency utilization efficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus that enable channel estimation and equalization utilizing scattered reference symbols in a cellular environment based on quadrature amplitude modulation-filter bank multicarrier (QAM-FBMC) transmission.

Another aspect of the present disclosure is to provide a reference symbol (RS) mapping method and apparatus that are suitable for a cellular environment based on QAM-FBMC transmission in consideration of subcarriers passing through two different filters unlike the existing cellular environment based on QAM orthogonal frequency division multiplexing (OFDM) transmission.

In accordance with another aspect of the present disclosure, a method and apparatus for channel estimation and derivation for each filter used in QAM-FBMC transmission is provided. Another aspect of the present disclosure is to provide a method and apparatus for equalizer realization using estimated channel information.

Accordingly, the present disclosure aims to enhance channel estimation accuracy and reception performance for the QAM-FBMC system.

In accordance with an aspect of the present disclosure, a method of signal transmission for a transmitter is provided. The method may include sending channel measurement information to a receiver, receiving channel related information from the receiver, selecting a first filter and a second filter to be used for signal transmission according to the received channel related information, mapping, when no performance difference is present between the first filter and the second filter, reference symbols evenly to subcarriers associated with the first filter and subcarriers associated with the second filter, mapping, when a performance difference is present between the first filter and the second filter, reference symbols preferentially to subcarriers associated with the transmitting filter with higher performance, and sending a transmit signal having the mapped reference symbols.

The method may further include determining whether the performance difference between the first filter and the second filter is greater than or equal to a preset threshold.

The method may further include determining whether the first filter and the second filter differ in terms of at least one of an amount of change and orthogonal robustness with respect to time domain delay.

The method may further include determining whether the first filter and the second filter differ in terms of filter coefficients.

Selecting the first filter and the second filter may include setting an information metric after analysis of the channel related information received from the receiver, determining information on the first filter and the second filter to be used for signal transmission by use of the information metric, and sending the information on the first filter and the second filter to the receiver.

The channel related information may include information regarding one or more of mobility, channel selectivity, location, and delay profile of the receiver.

Determining information on the first filter and the second filter may include determining whether a change between the previous information metric and the newly set information metric is greater than or equal to a preset threshold, selecting the first filter and the second filter according to the newly set information metric when the change in the information metric is greater than or equal to the threshold, and maintaining the existing first filter and the second filter when the change in the information metric is less than the threshold.

In accordance with another aspect of the present disclosure, a method of signal reception for a receiver is provided. The method includes receiving channel measurement information from a transmitter, performing channel measurement according to the received channel measurement information, sending the measured channel related information to the transmitter, receiving information on a first filter and a second filter to be used for signal reception from the transmitter, estimating, when a performance difference is present between the first filter and the second filter, channel information of subcarriers associated with the filter having higher performance among the first filter and the second filter, deriving channel information of subcarriers associated with the filter having lower performance by utilizing the estimated channel information, and performing signal detection by use of the estimated channel information and derived channel information.

The method may further include estimating channel information of subcarriers associated with the first filter and estimating channel information of subcarriers associated with the second filter when no performance difference is present between the first filter and the second filter.

Estimating channel information may include estimating channel information of subcarriers having a mapped reference symbol by utilizing the higher-performance filter among the first filter and the second filter, and estimating channel information of subcarriers without a mapped reference symbol among the subcarriers associated with the higher-performance filter by use of interpolation.

The method may further include determining whether the first filter and the second filter differ in terms of at least one of an amount of change and orthogonal robustness with respect to time domain delay.

The method may further include determining whether the first filter and the second filter differ in terms of filter coefficients.

The method may further include determining whether the performance difference between the first filter and the second filter is greater than or equal to a preset threshold.

The channel related information may include information regarding one or more of mobility, channel selectivity, location, and delay profile of the receiver.

In accordance with another aspect of the present disclosure, a transmitter is provided. The transmitter includes a communication unit to send and receive signals, and a control unit to control a process of sending channel measurement information to a receiver, receiving channel related information from the receiver, selecting a first filter and a second filter to be used for signal transmission according to the received channel related information, mapping, when no performance difference is present between the first filter and the second filter, reference symbols evenly to subcarriers associated with the first filter and subcarriers associated with the second filter, mapping, when a performance difference is present between the first filter and the second filter, reference symbols preferentially to subcarriers associated with the transmitting filter with higher performance, and sending a transmit signal having the mapped reference symbols.

In accordance with another aspect of the present disclosure, a receiver is provided. The receiver may include a communication unit to send and receive signals, and a control unit to control a process of receiving channel measurement information from a transmitter, performing channel measurement according to the received channel measurement information, sending the measured channel related information to the transmitter, receiving information on a first filter and a second filter to be used for signal reception from the transmitter, estimating, when a performance difference is present between the first filter and the second filter, channel information of subcarriers associated with the filter having higher performance among the first filter and the second filter, deriving channel information of subcarriers associated with the filter having lower performance by utilizing the estimated channel information, and performing signal detection by use of the estimated channel information and derived channel information.

In a feature of the present disclosure, it is possible to heighten channel estimation performance in a cellular environment based on QAM-FBMC transmission by mapping reference symbols evenly or according to weightings with respect to two filters depending upon filter characteristics.

In the present disclosure, time domain delay can be compared for two filters and the RS mapping scheme may be determined accordingly.

For example, when the two filters exhibit similar performance, reference symbols are evenly mapped, and channel estimation and equalizer realization can be achieved for all subcarriers.

As another example, when filter A exhibits better performance, reference symbols may be mapped to even subcarriers and even channel estimation may be performed. Thereafter, equalizer realization can be achieved by deriving channels associated with odd subcarriers from the even channels.

In the present disclosure, the RS mapping scheme may be designed in consideration of characteristics of QAM-FBMC transmission using two filters. Hence, RS mapping may be performed differently in a case where the two filters exhibit similar performance and in another case where one filter exhibits better performance, heightening channel estimation accuracy.

In addition, when one filter exhibits better performance, it is possible to realize an equalizer for the two filters by deriving a channel associated with the other filter from the channel estimated earlier.

Consequently, it is possible to increase the data reception rate through channel estimation/derivation and equalizer realization according to embodiments of the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In quadrature amplitude modulation-filter bank multi-carrier (QAM-FBMC) transmission according to one embodiment of the present disclosure, signals may be sent and received through two different filters satisfying orthogonality in the time domain and in the frequency domain by dividing M subcarriers into even subcarriers and odd subcarriers. Here, the filter overlapping factor is given by K.

For ease of description, the filter associated with even subcarriers is referred to as filter A (or first filter), and the filter associated with odd subcarriers is referred to as filter B (or second filter). The characteristics of the two filters (i.e., filter A and filter B) may be determined in terms of filter shape change amount due to time domain delay and orthogonal robustness. Filter A and filter B may be similar or different in terms of the amount of filter shape change due to time domain delay and orthogonal robustness. In the following description, for ease of explanation, when the two filters have different characteristics, it is assumed that filter A undergoes a lesser amount of change due to time domain delay and is of higher orthogonal robustness in comparison to filter B.

Figure 1:
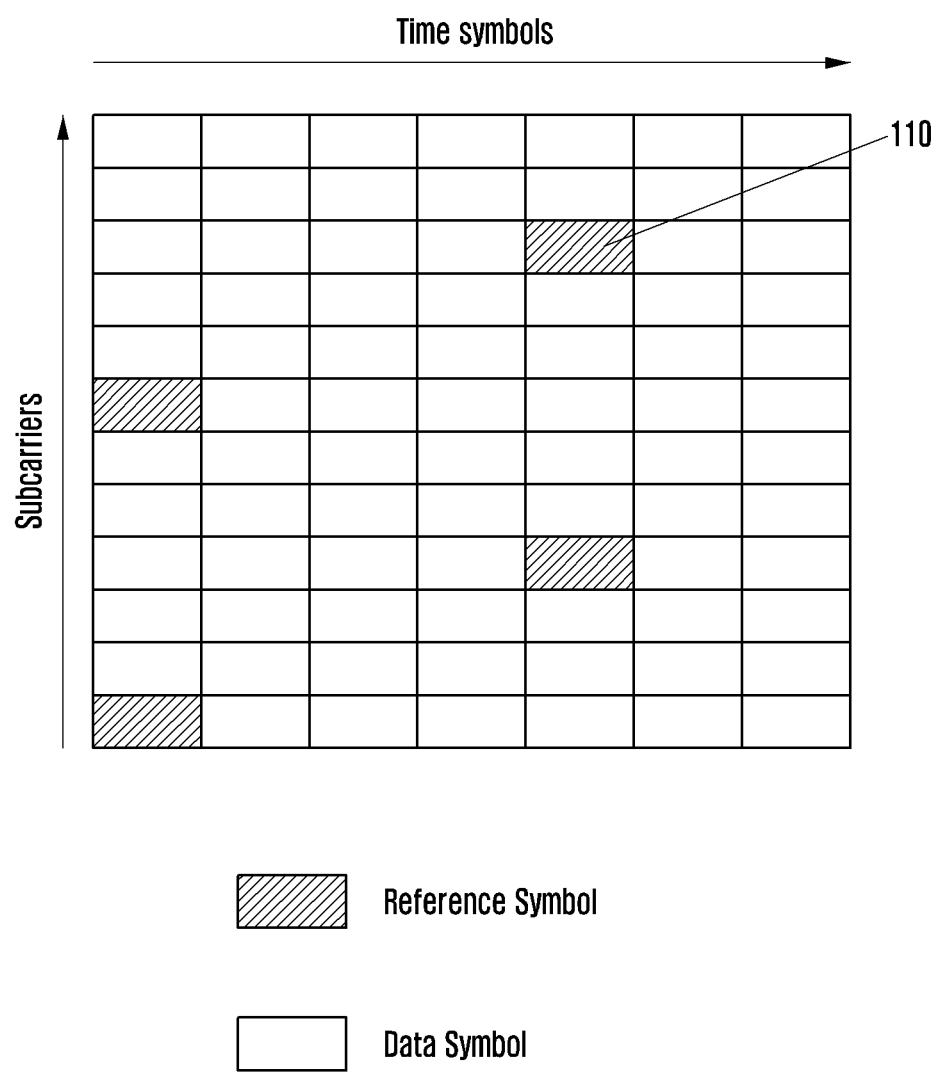
FIG. 1 illustrates a structure of subcarrier-reference symbol mappings for channel estimation based on scattered reference symbols in the quadrature amplitude modulation-orthogonal frequency division multiplexing (QAM-OFDM) system according to the related art.
Figure 2:
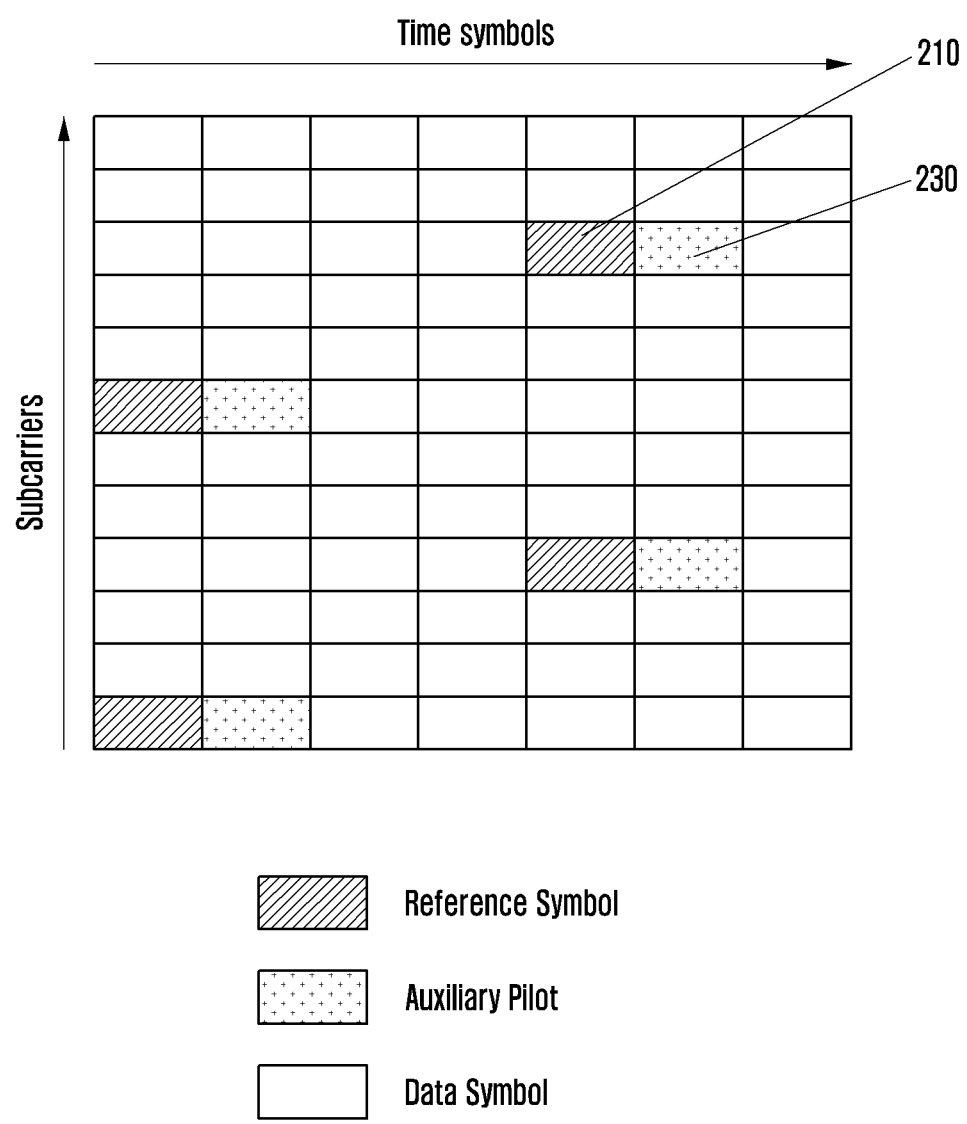
FIG. 2 illustrates a structure of subcarrier-reference symbol mappings for channel estimation based on scattered reference symbols in the OQAM-OFDM system according to the related art.
Figure 3:
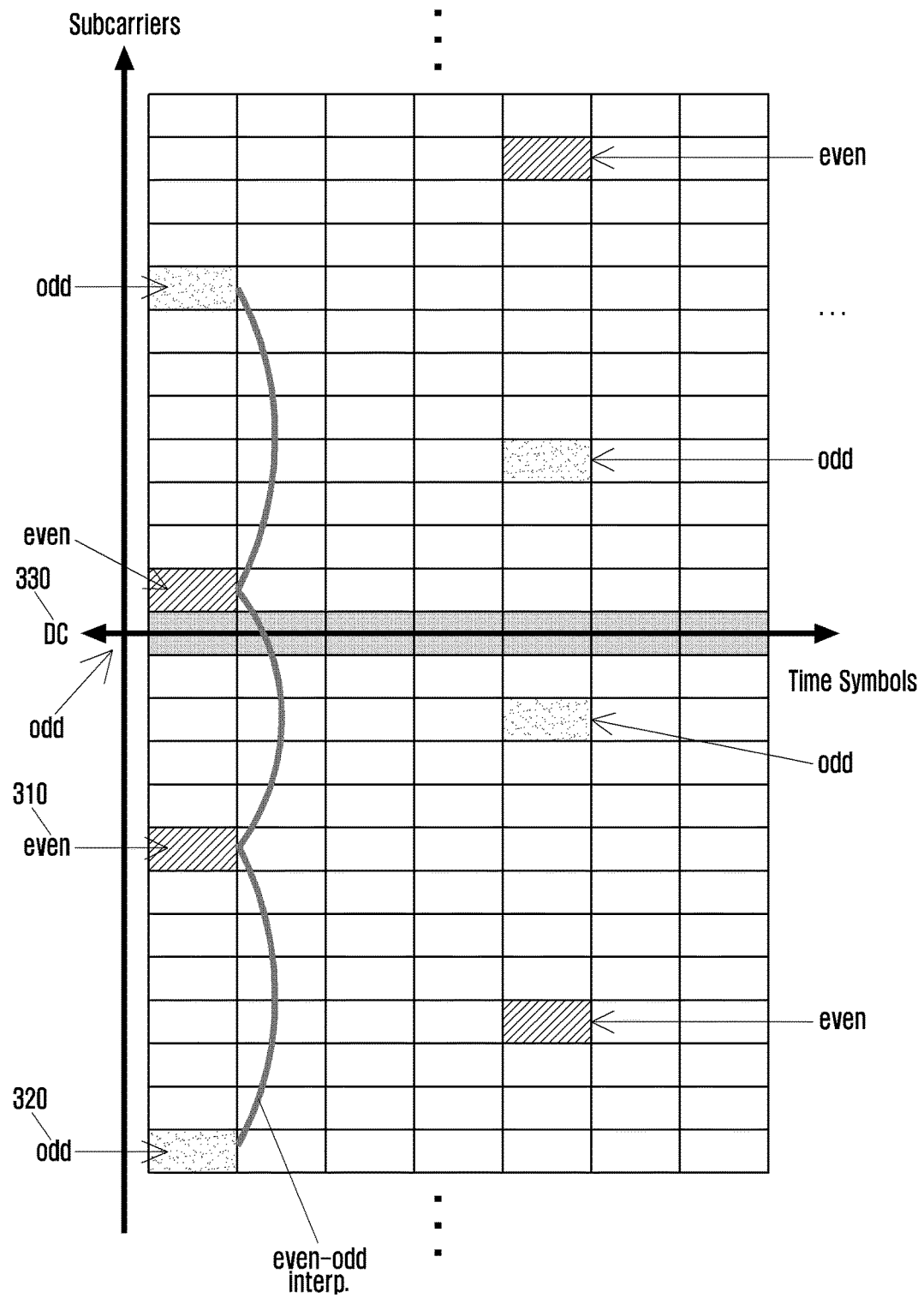
FIG. 3 illustrates a structure of subcarrier-reference symbol mappings for channel estimation according to an embodiment of the present disclosure.

FIG. 3 illustrates a structure of subcarrier-reference symbol mappings for channel estimation according to an embodiment of the present disclosure.

Referring to FIG. 3, in QAM-FBMC transmission according to one embodiment of the present disclosure, signals may be sent and received through two different filters satisfying orthogonality in the time domain and in the frequency domain by dividing M subcarriers into even subcarriers and odd subcarriers. When the two filters exhibit similar performance, the transmitter may divide M subcarriers into even subcarriers 310 and odd subcarriers 320, and map reference symbols (RSs) evenly to the even subcarriers 310 for filter A and to the odd subcarriers 320 for filter B. Here, DC 330 is an odd subcarrier associated with filter B. No reference symbol may be mapped to DC 330. As described before, performance of filter A and filter B may indicate the amount of filter shape change due to time domain delay and orthogonal robustness.

That is, the transmitter may determine whether a performance difference is present between filter A and filter B according to a given scheme for filter measurement and comparison. If the performance difference between filter A and filter B is less than a preset threshold, the transmitter may determine that filter A and filter B exhibit similar performance. When filter A and filter B exhibit similar performance, the transmitter may map reference symbols evenly to the even subcarriers 310 and the odd subcarriers 320. How to measure and compare filter characteristics is described later.

Figure 4:
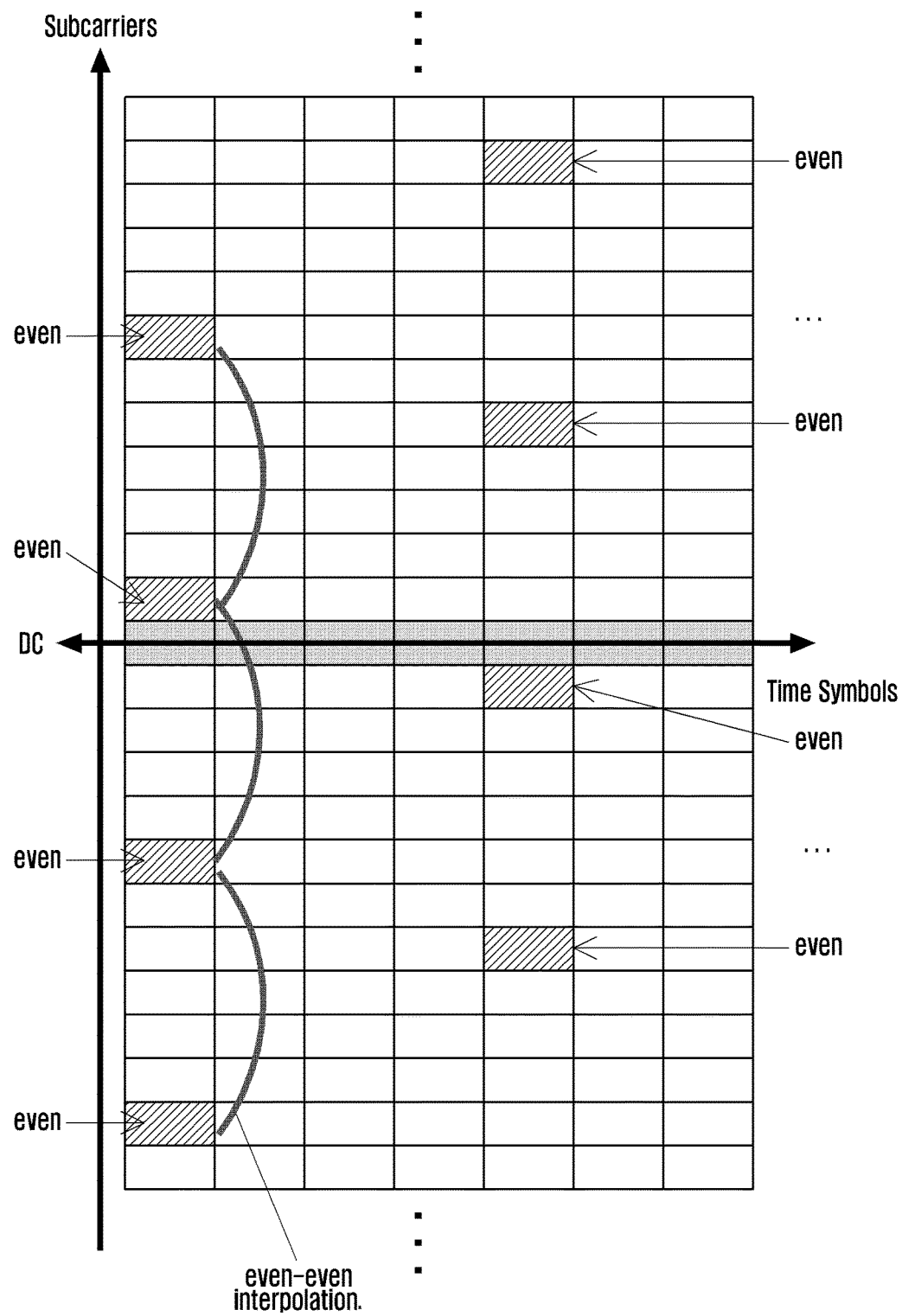
FIG. 4 illustrates a structure of subcarrier-reference symbol mappings for channel estimation according to another embodiment of the present disclosure.

FIG. 4 illustrates a structure of subcarrier-reference symbol mappings for channel estimation according to another embodiment of the present disclosure.

Referring to FIG. 4, the transmitter may measure and compare filter characteristics to determine whether a performance difference is present between filter A and filter B. For example, if filter A undergoes a lesser amount of change due to time domain delay and is of higher orthogonal robustness in comparison to filter B, the accuracy of channel estimation based on subcarriers associated with filter A may be higher. Hence, as shown in FIG. 4, the transmitter may map reference symbols preferentially to subcarriers associated with filter A having higher performance in comparison to subcarriers associated with filter B having lower performance.

That is, when filter A exhibits better performance than filter B, as shown in FIG. 4, the transmitter may map reference symbols to even subcarriers 410 associated with filter A for signal transmission.

Hereinabove, a description is given of a structure of subcarrier-reference symbol mappings for channel estimation according to an embodiment of the present disclosure.

Next, a description is given of signal transmission and reception between the transmitter and receiver according to an embodiment of the present disclosure.

Figure 5:
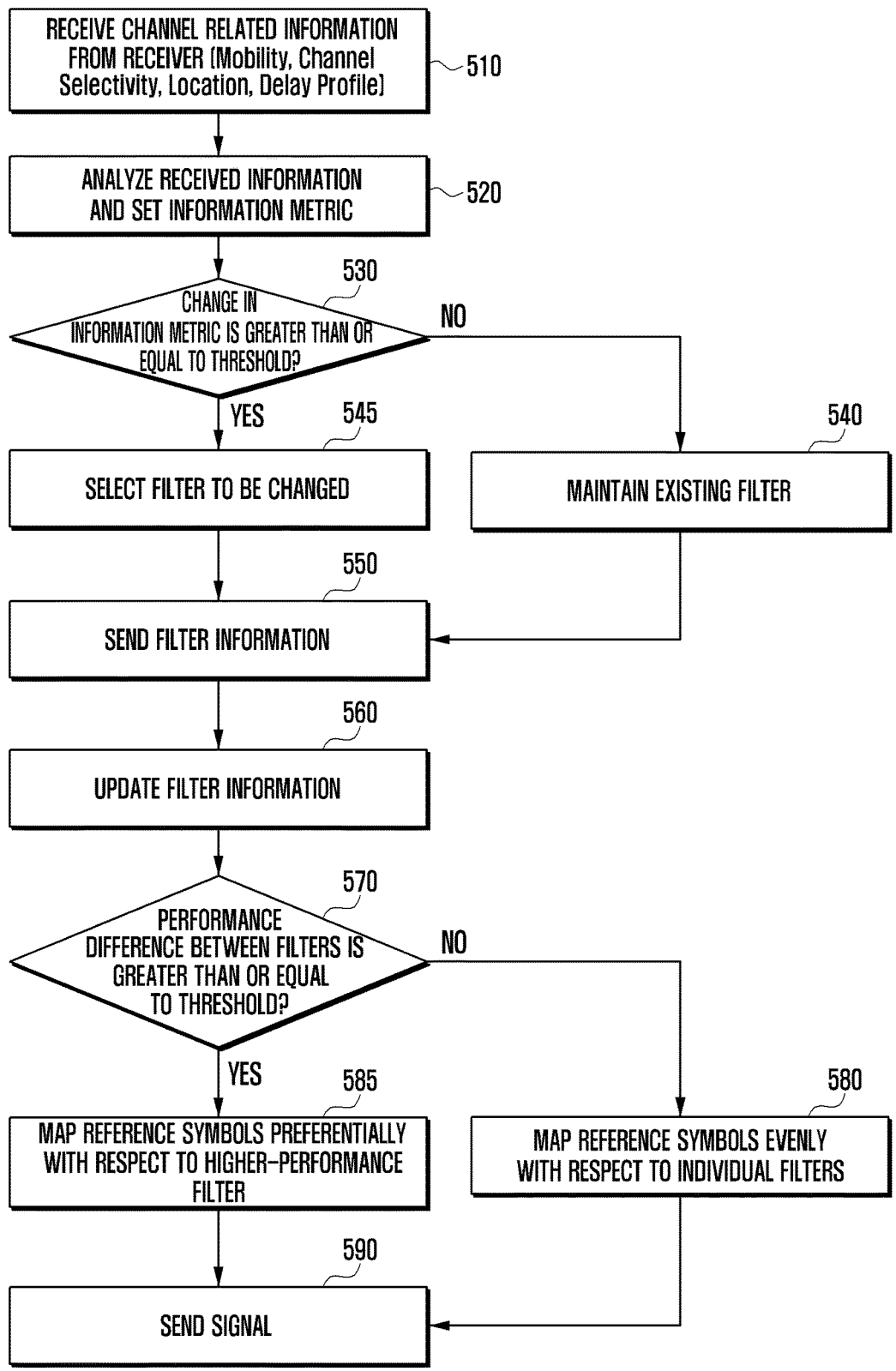
FIG. 5 is a flowchart of a procedure for signal transmission at the transmitter according to an embodiment of the present disclosure.

FIG. 5 is a flowchart of a procedure for signal transmission at the transmitter according to an embodiment of the present disclosure.

Referring to FIG. 5, the transmitter for QAM-FBMC may send channel measurement information to the receiver. That is, the transmitter may deliver information to be used for channel measurement to the receiver. The channel measurement information may include information regarding the number of antenna ports, RS configuration pattern, RS subframe and period thereof, and RS subframe offset needed for channel measurement using cell or UE-specific RSs. The channel measurement information may be transmitted via a downlink control channel or downlink data channel such as physical broadcast channel (PBCH, for master information block (MIB)) or physical downlink shared channel (PDSCH, for system information block (SIB)) or via radio resource control (RRC) messages. The channel measurement information may further include an indication to the filter to be measured by the receiver. For example, when filter information for signal transmission and reception is already present in the transmitter and the receiver, the transmitter may direct the receiver to measure the already selected filter via a message. The transmitter may direct the receiver to measure another filter in addition to the already selected filter. In this case, a filter index may be included in the channel measurement information. The channel measurement information may include information indicating the time when the receiver should perform channel measurement. For example, information indicating the channel measurement period and information indicating the measurement reporting period may be included. Information indicating aperiodic channel measurement may also be included.

Thereafter, at operation 520, the transmitter receives receiver channel information from the receiver. The receiver channel information may include information regarding one or more of mobility, channel selectivity, location, and delay profile of the receiver according to embodiments. The receiver channel information may further include some other type of information. The receiver channel information may be received on a periodic basis. For example, the receiver may perform channel measurement and report measurement results to the transmitter on a periodic basis. The receiver channel information may be received on an aperiodic basis. For example, the receiver may perform channel measurement and report measurement results to the transmitter on an aperiodic basis. Meanwhile, the receiver channel information may be received through an uplink data channel or uplink control channel such as physical uplink shared channel (PUSCH) or physical uplink control channel (PUCCH). For example, when channel measurement is performed on an aperiodic basis, receiver channel information may be received through an uplink data channel. When channel measurement is performed on a periodic basis, receiver channel information may be received through an uplink control channel. The receiver channel information reported to the transmitter may include channel quality indicator (CQI), rank indicator (RI) and precoding matrix indicator (PMI), and may further include mobility and channel selectivity indications.

At operation 520, the transmitter analyzes the receiver channel information received at operation 510 and sets an information metric representing the receiver channel information.

At operation 530, the transmitter determines whether a channel state change has occurred at the receiver. For example, the transmitter may compare the current information metric with the previous information metric to determine whether a change in the information metric is greater than or equal to a preset threshold. Here, the threshold may be a value pre-stored in the transmitter or received from a network entity.

If a channel state change has not occurred at the receiver, the transmitter maintains the current filter at operation 540 and sends filter information to the receiver at operation 550.

If a channel state change has occurred at the receiver, at operation 545, the transmitter selects a suitable filter according to the receiver channel information. The transmitter may select a filter based on the current information metric set at operation 520. At operation 550, the transmitter sends information on the selected filter to the receiver.

After sending filter information, at operation 560, the transmitter updates the filter information. That is, the filter information may be updated according to sustenance of the existing filter at operation 540 or selection of a new filter at operation 545. When the existing filter is maintained at operation 540, operation 560 for filter information update may be skipped as the existing stored filter information is sustained without modification.

Thereafter, the transmitter may determine whether a performance difference is present between the filters based on the updated filter information, and change the RS mapping scheme according to a filter performance difference if present.

Specifically, at operation 570, the transmitter determines whether a performance difference is present between the filters based on the updated filter information. That is, the transmitter may determine presence of a performance difference between the filters according to the receiver filter information. The transmitter may determine whether the performance difference is greater than or equal to a preset threshold. As described before, filter performance may indicate the amount of filter shape change due to time domain delay and orthogonal robustness. In one embodiment, presence of a performance difference between the filters may be determined by comparing filter coefficients.

If the filter performance difference is not greater than or equal to the preset threshold (i.e., filters show similar performance), at operation 580, the transmitter maps reference symbols evenly to the filters. For example, as described in connection with FIG. 3, when two filters (i.e., filter A and filter B) are used, the transmitter may divide M subcarriers into even and odd subcarriers and map reference symbols evenly to the even subcarriers for filter A and the odd subcarriers for filter B.

If the filter performance difference is greater than or equal to the preset threshold (i.e., filters show dissimilar performance), at operation 585, the transmitter map reference symbols preferentially to subcarriers associated with the filter having higher performance. For example, as described in connection with FIG. 4, when two filters (i.e., filter A and filter B) are used, if filter A undergoes a lesser amount of change due to time domain delay and is of higher orthogonal robustness, the transmitter may map reference symbols preferentially to subcarriers associated with filter A.

Thereafter, at operation 590, the transmitter sends signals with mapped RSs to the receiver.

Figure 6:
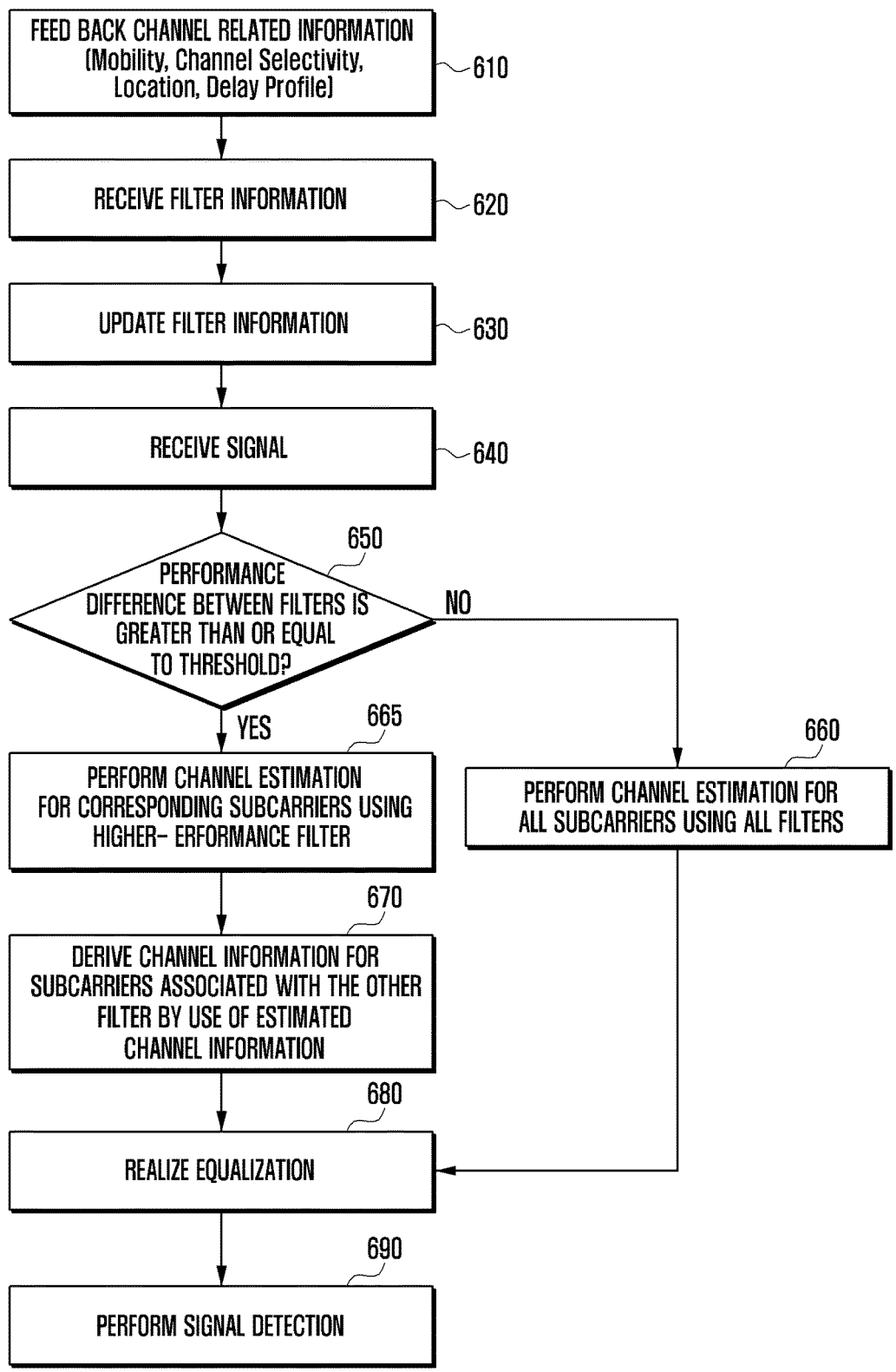
FIG. 6 is a flowchart of a procedure for signal reception at the receiver according to an embodiment of the present disclosure.

FIG. 6 is a flowchart of a procedure for signal reception at the receiver according to an embodiment of the present disclosure.

Referring to FIG. 6, the receiver for QAM-FBMC may receive channel measurement information from the transmitter. That is, the receiver may receive information to be used for channel measurement from the transmitter. The channel measurement information may include information regarding the number of antenna ports, RS configuration pattern, RS subframe and period thereof, and RS subframe offset needed for channel measurement using cell or UE-specific RSs. The channel measurement information may be received via a downlink control channel or downlink data channel such as PBCH, for MIB or PDSCH, for SIB or via RRC messages. The channel measurement information may further include an indication to the filter to be measured by the receiver. For example, when filter information for signal transmission and reception is already present in the transmitter, the transmitter may direct the receiver to measure the already selected filter via a message. The transmitter may direct the receiver to measure another filter in addition to the already selected filter. In this case, a filter index may be included in the channel measurement information. The channel measurement information may include information indicating the time when the receiver should perform channel measurement. For example, information indicating the channel measurement period and information indicating the measurement reporting period may be included. Information indicating aperiodic channel measurement may also be included.

Upon reception of the channel measurement information, the receiver may perform channel measurement on a periodic basis or on an aperiodic basis.

Thereafter, at operation 610, the receiver sends receiver channel information as feedback to the transmitter. The receiver channel information may include information regarding one or more of mobility, channel selectivity, location, and delay profile of the receiver according to embodiments. The receiver channel information may further include some other type of information. The receiver channel information may be transmitted on a periodic basis. For example, the receiver may perform channel measurement and report measurement results to the transmitter on a periodic basis. The receiver channel information may be sent on an aperiodic basis. For example, the receiver may perform channel measurement and report measurement results to the transmitter on an aperiodic basis. Meanwhile, the receiver channel information may be sent through an uplink data channel or uplink control channel such as PUSCH or PUCCH. For example, when channel measurement is performed on an aperiodic basis, receiver channel information may be sent through an uplink data channel. When channel measurement is performed on a periodic basis, receiver channel information may be sent through an uplink control channel. The receiver channel information reported to the transmitter may include CQI, RI and PMI, and may further include mobility and channel selectivity indications.

At operation 620, the receiver receives filter information from the transmitter. The filter information indicates a filter selected by the transmitter using the receiver channel information as described before in connection with FIG. 5. At operation 630, the receiver updates the existing filter information according to the newly received filter information.

At operation 640, the receiver receives signals from the transmitter.

Thereafter, the receiver may determine the channel estimation scheme through filter performance analysis.

Specifically, at operation 650, the receiver determines whether a performance difference is present between the filters based on the updated filter information. That is, the receiver may determine presence of a performance difference between the filters according to the received filter information. The receiver may determine whether the performance difference is greater than or equal to a preset threshold. As described before, filter performance may indicate the amount of filter shape change due to time domain delay and orthogonal robustness. In one embodiment, presence of a performance difference between the filters may be determined by comparing filter coefficients.

If the filter performance difference is not greater than or equal to the preset threshold (filters show similar performance), at operation 660, the receiver performs channel estimation for all subcarriers by use of all the filters. For example, when two filters (filter A and filter B) are used, the receiver may perform channel estimation for subcarriers with RS mappings by use of RSs mapped to even subcarriers associated with filter A and RSs mapped to odd subcarriers associated with filter B. The channel information for all the subcarriers may be estimated through interpolation from the channel information estimated for the subcarriers with RS mappings.

If the filter performance difference is greater than or equal to the preset threshold (filters show dissimilar performance), at operation 665, the receiver performs channel estimation for subcarriers associated with the filter having higher performance. For example, when two filters (filter A and filter B) are used, if filter A undergoes a lesser amount of change due to time domain delay and is of higher orthogonal robustness in comparison to filter B, the receiver may perform channel estimation for even subcarriers associated with filter A. At operation 670, the receiver derives a channel associated with the other filter by use of the estimated channel information. For example, the receiver may derive a channel for odd subcarriers associated with filter B by use of the channel information estimated for even subcarriers associated with filter A. The receiver may obtain channel information for all the subcarriers by interpolating the estimated channel information to the remaining subcarriers.

After channel estimation and derivation, at operation 680, the receiver performs equalizer realization. At operation 690, the receiver performs signal detection through the realized equalizer.

Hereinabove, a description is given of signal transmission and reception between the transmitter and the receiver.

Next, a description is given of filter configuration between the transmitter and the receiver.

Figure 7:
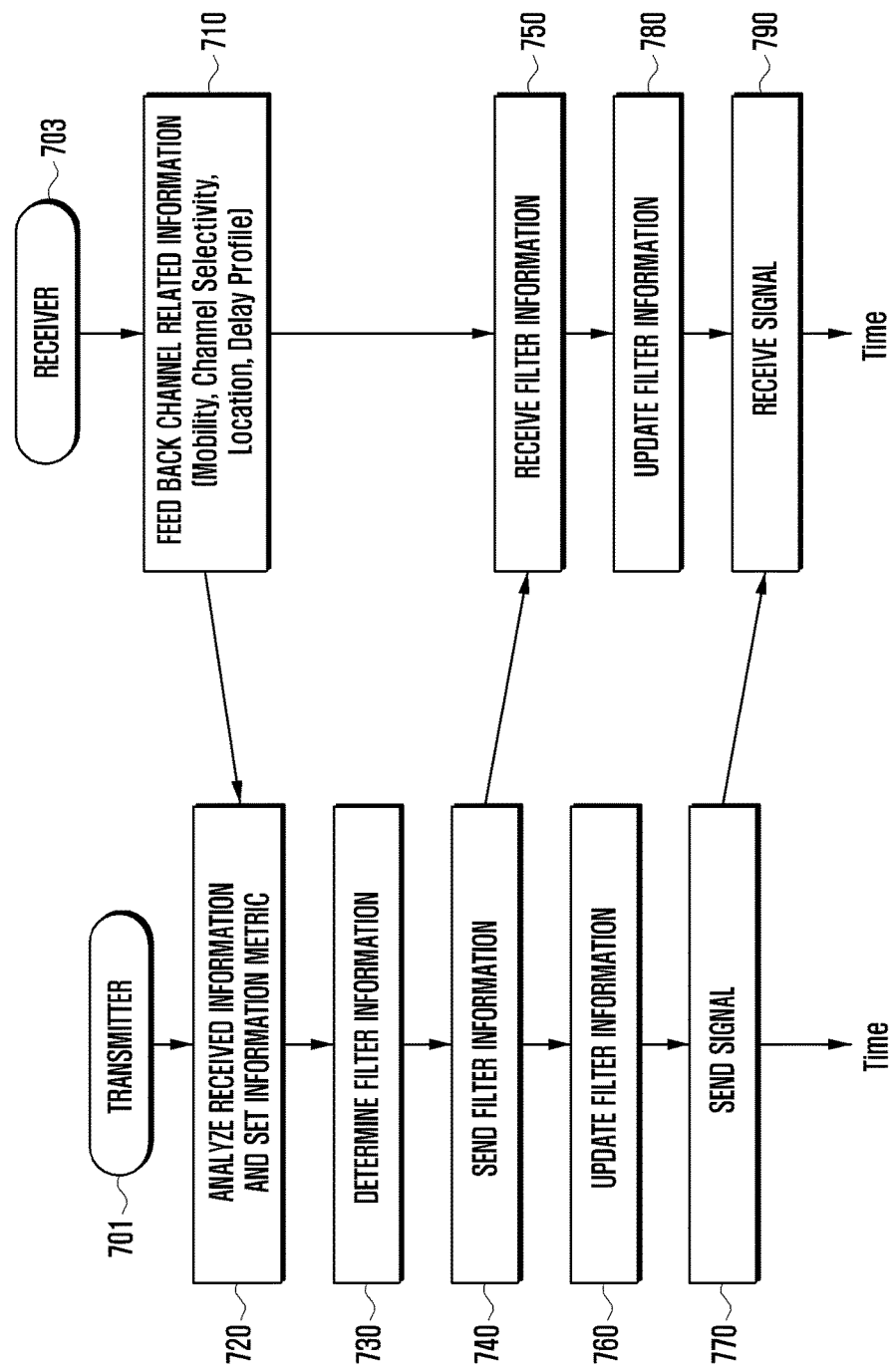
FIG. 7 illustrates a procedure for filter configuration between the transmitter and receiver according to an embodiment of the present disclosure.

FIG. 7 illustrates a procedure for filter configuration between the transmitter and receiver according to an embodiment of the present disclosure.

Referring to FIG. 7, the transmitter 701 may send channel measurement information to the receiver 703. That is, the transmitter 701 may deliver information to be used for channel measurement to the receiver 703. The channel measurement information may include information regarding the number of antenna ports, RS configuration pattern, RS subframe and period thereof, and RS subframe offset needed for channel measurement using cell or UE-specific RSs. The channel measurement information may be transmitted via a downlink control channel or downlink data channel such as PBCH, for MIB or PDSCH, for SIB or via RRC messages. The channel measurement information may further include an indication to the filter to be measured by the receiver 703. For example, when filter information for signal transmission and reception is already present in the transmitter 701, the transmitter 701 may direct the receiver 703 to measure the already selected filter via a message. The transmitter 701 may direct the receiver 703 to measure another filter in addition to the already selected filter. In this case, a filter index may be included in the channel measurement information. The channel measurement information may include information indicating the time when the receiver 703 should perform channel measurement. For example, information indicating the channel measurement period and information indicating the measurement reporting period may be included. Information indicating aperiodic channel measurement may also be included.

Upon reception of the channel measurement information, the receiver 703 may perform channel measurement on a periodic basis or on an aperiodic basis.

Thereafter, at operation 710, the receiver 703 sends receiver channel information as feedback to the transmitter 701. The receiver channel information may include information regarding one or more of mobility, channel selectivity, location, and delay profile of the receiver 703 according to embodiments. The receiver channel information may further include some other type of information. The receiver channel information may be transmitted on a periodic basis. For example, the receiver 703 may perform channel measurement and report measurement results to the transmitter 701 on a periodic basis. The receiver channel information may be sent on an aperiodic basis. For example, the receiver 703 may perform channel measurement and report measurement results to the transmitter 701 on an aperiodic basis. Meanwhile, the receiver channel information may be sent through an uplink data channel or uplink control channel such as PUSCH or PUCCH. For example, when channel measurement is performed on an aperiodic basis, receiver channel information may be sent through an uplink data channel. When channel measurement is performed on a periodic basis, receiver channel information may be sent through an uplink control channel. The receiver channel information reported to the transmitter 701 may include CQI RI and PMI, and may further include mobility and channel selectivity indications.

At operation 720, the transmitter 701 analyzes the receiver channel information received from the receiver 703 and sets an information metric representing the receiver channel information.

At operation 730, the transmitter 701 determines filter information to be used for signal transmission and reception such as filter coefficients and filter orders by use of the information metric. At operation 740, the transmitter 701 sends the filter information to the receiver 703. At operation 760, the transmitter 701 may update the filter information.

At operation 750, the receiver 703 receives the filter information from the transmitter 701. At operation 780, the receiver 703 may update the received filter information.

Thereafter, at operation 770, the transmitter 701 sends signals to the receiver 703 using the updated filter information. At operation 790, the receiver 703 receives signals from the transmitter 701 using the updated filter information.

Hereinabove, a description is given of filter configuration between the transmitter and the receiver.

Next, a description is given of measurement and comparison of filter characteristics in the transmitter and receiver.

As described before, in QAM-FBMC transmission according to one embodiment of the present disclosure, signals may be sent and received through two different filters (filter A and filter B) satisfying orthogonality in the time domain and in the frequency domain by dividing M subcarriers into even subcarriers and odd subcarriers.

Here, assume that g(t) and f(t) are the prototype functions of filter A and filter B, respectively, and assume that $g_{m,n}(t)$ and $f_{m,n}(t)$ represent respectively filters corresponding to the $m^{th}$ subcarrier of the $n^{th}$ symbol (translated in time and frequency).

For time domain delay, filter A and filter B may be compared in terms of autocorrelation and cross-correlation. For ease of description, the following description is focused on the prototype function corresponding to the filter without translation in time and frequency. The following equations are given for measurement and comparison of filter characteristics.

First, the amount of change of filter A or filter B due to time domain delay may be represented as autocorrelation as shown below in Equation 1 or Equation 2.

$$R_g(\tau) = \int_{-\infty}^{\infty} g(t-\tau)g^*(t)dt \quad \text{Equation 1}$$

$$R_f(\tau) = \int_{-\infty}^{\infty} f(t-\tau)f^*(t)dt \quad \text{Equation 2}$$

Then, the function to compare the change amounts of filter A and filter B due to time domain delay may be represented as an autocorrelation difference as shown below in Equation 3.

$$D_T(\tau) = R_g(\tau) - R_f(\tau) \quad \text{Equation 3}$$

For example, when the magnitude of the function to compare the change amounts due to time domain delay is greater than a positive threshold $\epsilon_1$ (i.e., $|D_T(\tau)| > \epsilon_1$), this may indicate that the two filters exhibit a performance difference in the amount of change due to time domain delay. If otherwise, the two filters may be regarded as exhibiting similar performance in the amount of change due to time domain delay.

Here, when the magnitude of the function to compare the change amounts due to time domain delay is greater than the positive threshold and the function is positive (i.e., $D_T(\tau) > \epsilon_1$), this may indicate that filter A exhibits better performance than filter B in the amount of change due to time domain delay. The opposite case (i.e., $D_T(\tau) < -\epsilon_1$) may indicate that filter B exhibits better performance than filter A in the amount of change due to time domain delay.

Second, the orthogonality of filter A or filter B with respect to time domain delay may be represented as sum of cross-correlation magnitudes as shown below in Equation 4 or Equation 5.

$$I_g(\tau) = \sum_{m \neq 0} \sum_{n \neq 0} \left\{ \left| \int_{-\infty}^{\infty} g_{m,n}(t-\tau)g^*(t)dt \right| + \left| \int_{-\infty}^{\infty} f_{m,n}(t-\tau)g^*(t)dt \right| \right\} \quad \text{Equation 4}$$

$$I_f(\tau) = \sum_{m \neq 0} \sum_{n \neq 0} \left\{ \left| \int_{-\infty}^{\infty} f_{m,n}(t-\tau)f^*(t)dt \right| + \left| \int_{-\infty}^{\infty} g_{m,n}(t-\tau)f^*(t)dt \right| \right\} \quad \text{Equation 5}$$

Here, Equation 4 (Equation 5) indicates the amount of interference generated during reception using the prototype function g(t) (f(t)). That is, the amount of interference generated by neighboring symbols and neighboring subcarriers with respect to time domain delay is used as a measure of orthogonality.

Then, the function to compare the orthogonality of filter A and filter B with respect to domain delay may be represented as an interference difference as shown below in Equation 6.

$$D_I(\tau) = I_f(\tau) - I_g(\tau) \quad \text{Equation 6}$$

For example, when the magnitude of the function to compare the orthogonality with respect to time domain delay is greater than a positive threshold $\epsilon_2$ (i.e., $|D_I(\tau)| > \epsilon_2$), this may indicate that the two filters exhibit a performance difference in the orthogonality with respect to time domain delay. If otherwise, the two filters may be regarded as exhibiting similar performance in the orthogonality with respect to time domain delay.

Here, when the magnitude of the function to compare the orthogonality with respect to time domain delay is greater than the positive threshold and the function is positive (i.e., $D_I(\tau) > \epsilon_2$), this may indicate that filter A exhibits better performance than filter B in the orthogonality with respect to time domain delay. The opposite case (i.e., $D_I(\tau) < -\epsilon_2$) may indicate that filter B exhibits better performance than filter A in the orthogonality with respect to time domain delay.

Meanwhile, the function to compare performances of the two filters in consideration of both the amount of change and the orthogonality with respect to time domain delay may be defined by a sum of weighted comparison functions with positive weights $\alpha$ and $\beta$ as shown below in Equation 7.

$$D(\tau) = \alpha D_T(\tau) + \beta D_I(\tau) \quad \text{Equation 7}$$

For example, when the magnitude of the weighted sum function in Equation 7 is greater than a positive threshold $\epsilon_3$ (i.e., $|D(\tau)| > \epsilon_3$), this may indicate that the two filters exhibit a performance difference with respect to time domain delay. If otherwise, the two filters may be regarded as exhibiting similar performance with respect to time domain delay.

Here, when the magnitude of the weighted sum function is greater than the positive threshold and the function is positive (i.e., $D(\tau) > \epsilon_3$), this may indicate that filter A exhibits better performance than filter B with respect to time domain delay. The opposite case (i.e., $D(\tau) < -\epsilon_3$) may indicate that filter B exhibits better performance than filter A with respect to time domain delay.

Hereinabove, a description is given of measurement and comparison of filter characteristics in the transmitter and receiver.

Next, a description is given of transmitter operation according to an embodiment of the present disclosure.

The transmitter for the QAM-FBMC system according to one embodiment of the present disclosure may be realized by use of time domain filtering or frequency domain filtering. Hereinafter, for ease of description, it is assumed that filter A and filter B denote time domain filters and filter A' and filter B' denote frequency domain filters corresponding to filter A and filter B.

Figure 8:
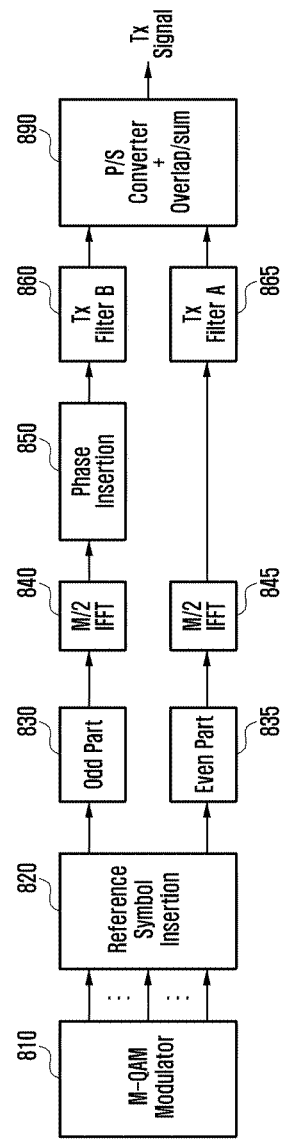
FIG. 8 illustrates realization of a transmitter according to an embodiment of the present disclosure.

FIG. 8 illustrates realization of a transmitter according to an embodiment of the present disclosure.

Referring to FIG. 8, the transmitter may be realized based on time domain filter A 865 and time domain filter B 860. As described before in connection with FIGS. 3 to 7, the transmitter may map reference symbols to even/odd subcarriers according to the performance of filter A 865 and filter B 860. Herein, reference symbols are inserted 820 on subcarriers among symbols from an M-QAM modulator 810.

To implement even and odd subcarriers, inverse fast fourier transform (IFFT) 845 and 840 of size M/2 is respectively applied to even part 835 and odd part 830. To prevent subcarrier overlapping, a phase 850 is introduced to the odd part 830. In another embodiment, a phase may be introduced to the even part 835.

IFFT 845 and 840 outputs are fed respectively to time domain filter A 865 and time domain filter B 860, and filter outputs are transmitted as a signal to the receiver through overlap and sum operation 890.

Figure 9:
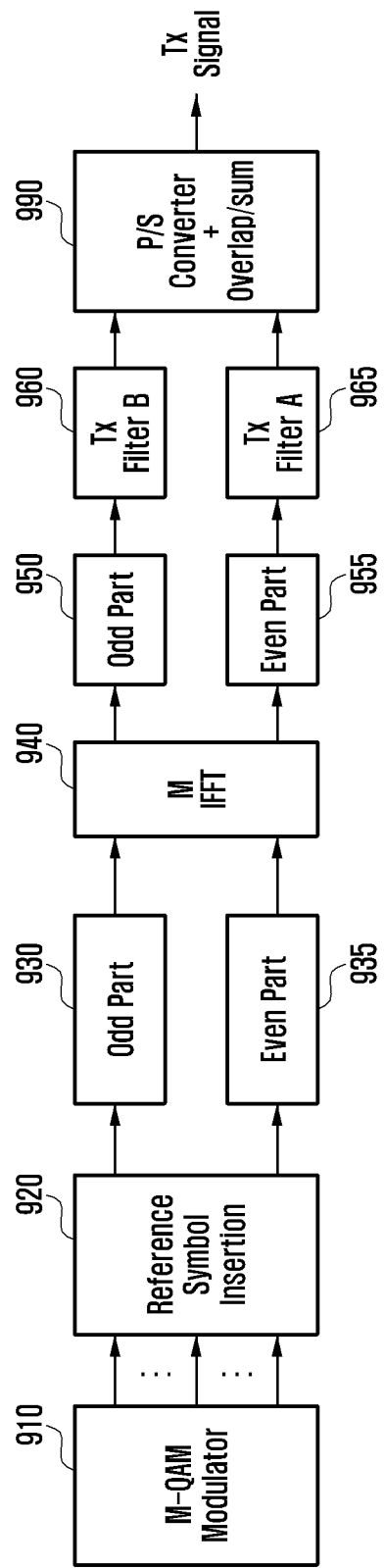
FIG. 9 illustrates realization of a transmitter according to another embodiment of the present disclosure.

FIG. 9 illustrates realization of a transmitter according to another embodiment of the present disclosure.

Referring to FIG. 9, the transmitter may be realized basis on time domain filter A 965 and time domain filter B 960.

The RS mapping scheme of FIG. 9 is similar to that of FIG. 8. Herein, reference symbols are inserted 920 on subcarriers among symbols from an M-QAM modulator 910. However, to implement even and odd subcarriers, inverse fast fourier transform (IFFT) 940 of size M is applied to even and odd parts 935 and 930. Mobile inverse fast fourier transform (M IFFT) outputs are separated into even and odd parts 955 and 950, which are fed respectively to time domain filter A 965 and time domain filter B 960. Filter outputs are transmitted as a signal to the receiver through overlap and sum operation 990.

Figure 10:
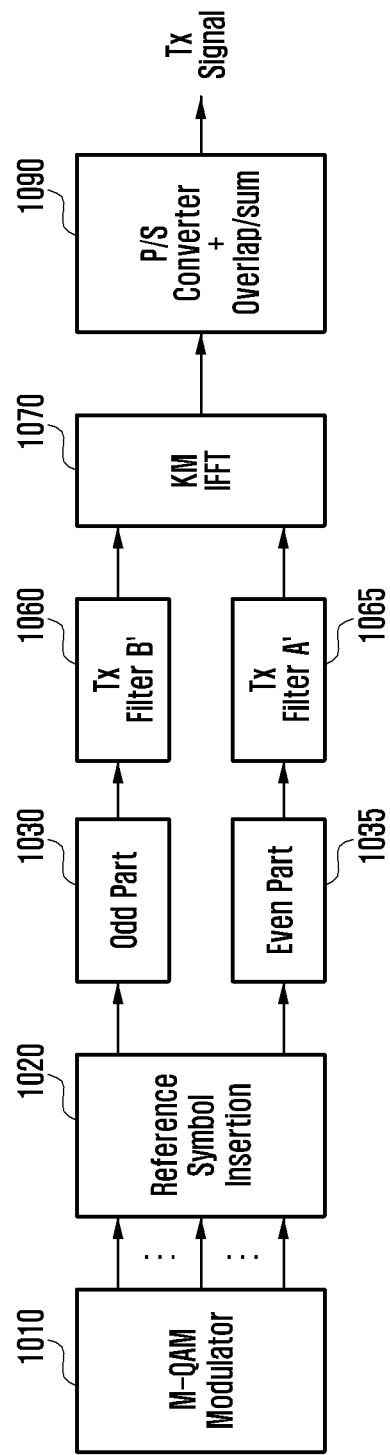
FIG. 10 illustrates realization of a transmitter according to another embodiment of the present disclosure.

FIG. 10 illustrates realization of a transmitter according to another embodiment of the present disclosure.

Referring to FIG. 10, the transmitter may be realized based on frequency domain filter A' 1065 and frequency domain filter B' 1060.

The RS mapping scheme of FIG. 10 is similar to that of FIG. 8. Herein, reference symbols are inserted 1020 on subcarriers among symbols from an M-QAM modulator 1010. However, even and odd parts 1035 and 1030 are fed respectively to frequency domain filter A' 1065 and frequency domain filter B' 1060. That is, unlike the transmitter shown in FIG. 8 or FIG. 9 implemented using time domain filters, in the transmitter of FIG. 10 implemented using frequency domain filter A' 1065 and frequency domain filter B' 1060, IFFT is not applied to inputs of frequency domain filter A' 1065 and frequency domain filter B' 1060.

Even and odd parts 1035 and 1030 are fed respectively to frequency domain filter A' 1065 and frequency domain filter B' 1060, and IFFT 1070 of size KM is applied to filter outputs. Here, K may range from 2 to 4 according to embodiments, and may be not limited thereto.

Filter outputs are transmitted as a signal to the receiver through overlap and sum operation 1090.

Hereinabove, a description is given of transmitter operation according to an embodiment of the present disclosure.

Next, a description is given of receiver operation according to an embodiment of the present disclosure.

Implementation of the transmitter for the QAM-FBMC system may depend upon performance of two filters or use of time or frequency domain filters. As described before, filter A and filter B denote time domain filters, and filter A' and filter B' denote frequency domain filters corresponding to filter A and filter B.

Figure 11:
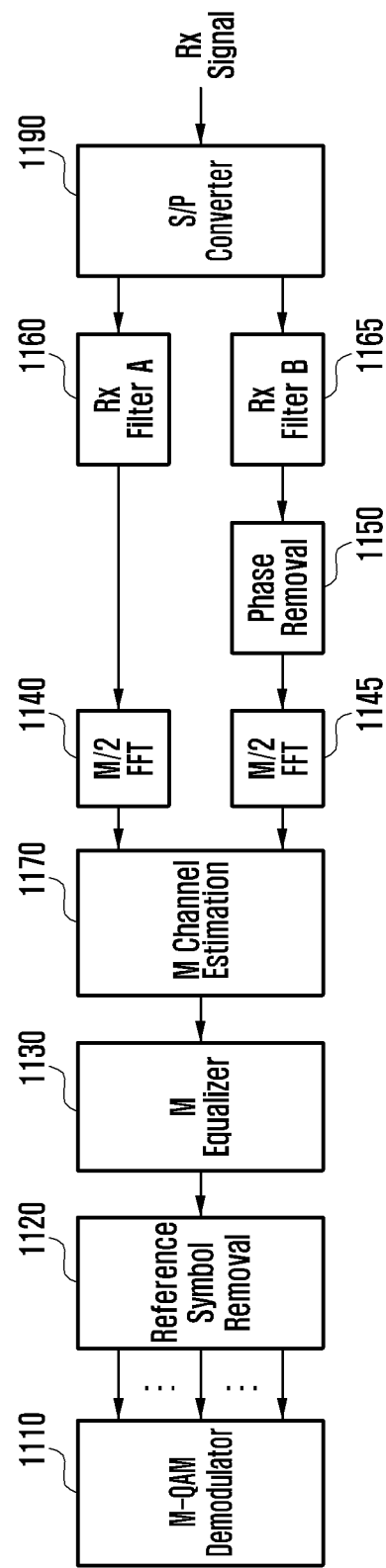
FIG. 11 illustrates realization of a receiver according to an embodiment of the present disclosure.

FIG. 11 illustrates realization of a receiver according to an embodiment of the present disclosure.

Referring to FIG. 11, the receiver may be realized based on time domain filter A 1160 and time domain filter B 1165. Here, filter A 1160 and filter B 1165 may exhibit similar performance.

The signal received from serial/parallel (S/P) converter 1190 is separated into even and odd subcarriers through time domain filter A 1160 and time domain filter B 1165, fast fourier transform (FFT) 1145 and 1140 of size M/2 is applied respectively to even and odd subcarriers. When a phase has been introduced to the odd part at the transmitter, phase removal 1150 is applied to the odd subcarriers before FFT. According to embodiments, when a phase has been introduced to the even part at the transmitter, phase removal may be applied to the even subcarriers before FFT.

Channel information for subcarriers with RS mappings is estimated and channel information for the remaining subcarriers is estimated 1170 through interpolation, so that channel information for the M subcarriers may be estimated.

To detect data mapped to the even and odd subcarriers using M-channel information, an equalizer 1130 of size M is applied to the subcarriers 1130. Thereafter, reference symbols are removed 1120 before M-QAM demodulation 1110.

Figure 12:
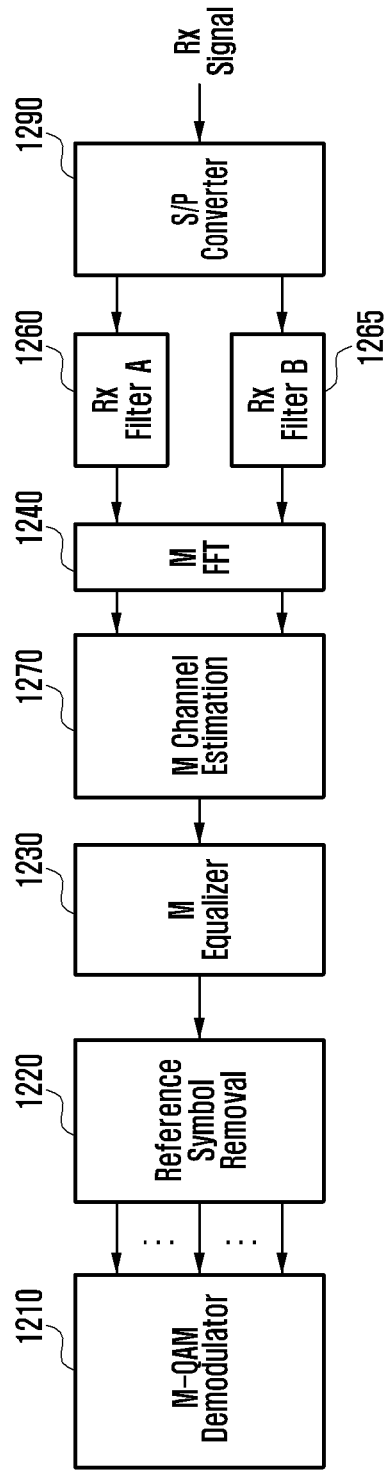
FIG. 12 illustrates realization of a receiver according to another embodiment of the present disclosure.

FIG. 12 illustrates realization of a receiver according to another embodiment of the present disclosure.

Referring to FIG. 12, the receiver may be realized based on time domain filter A 1260 and time domain filter B 1265. Here, filter A 1260 and filter B 1265 may exhibit similar performance.

The signal received from serial/parallel (S/P) converter 1290 is separated into even and odd subcarriers through time domain filter A 1260 and time domain filter B 1265. FFT 1240 of size M is applied to the even and odd subcarriers. Channel information estimation 1270 for M subcarriers and equalization 1230 of size M are similar to those in FIG. 11. Thereafter, reference symbols are removed 1220 before M-QAM demodulation 1210.

Figure 13:
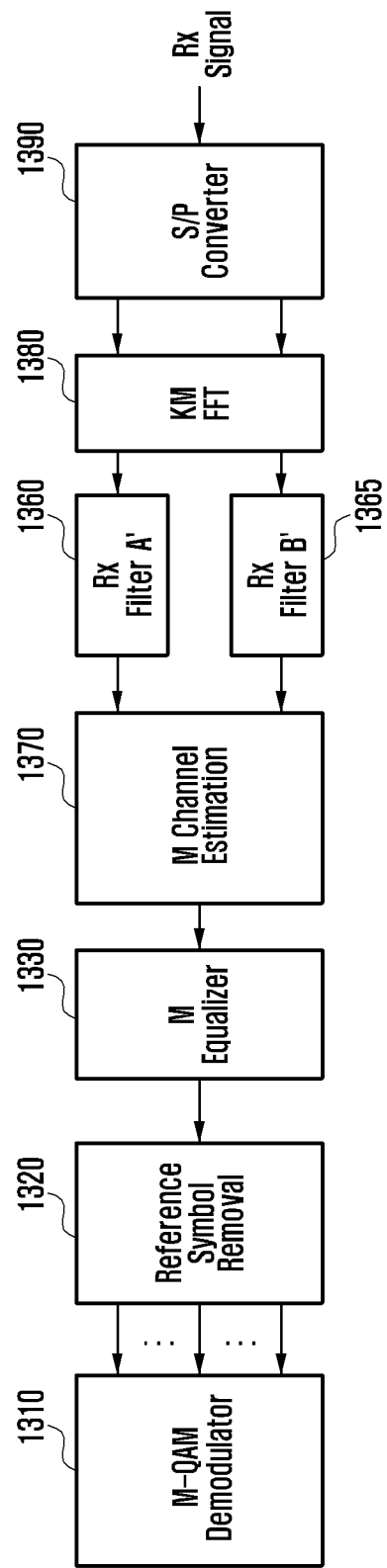
FIG. 13 illustrates realization of a receiver according to another embodiment of the present disclosure.

FIG. 13 illustrates realization of a receiver according to another embodiment of the present disclosure.

Referring to FIG. 13, the receiver may be realized based on frequency domain filter A' 1360 and frequency domain filter B' 1365. Here, filter A' 1360 and filter B' 1365 may exhibit similar performance.

FFT 1380 of size KM is applied to the signal received from serial/parallel (S/P) converter 1390. That is, unlike the receiver shown in FIG. 11 or FIG. 12 implemented using time domain filters, in the transmitter of FIG. 13 implemented using frequency domain filter A' 1360 and frequency domain filter B' 1365, IFFT is applied to the input received signal before filtering. Here, K may range from 2 to 4 according to embodiments, and may be not limited thereto.

Outputs of FFT with size KM are separated into even and odd subcarriers through frequency domain filter A' 1360 and frequency domain filter B' 1365. Channel information estimation 1370 for M subcarriers and equalization 1330 of size M are similar to those in FIG. 11. Thereafter, reference symbols are removed 1320 before M-QAM demodulation 1310.

Figure 14:
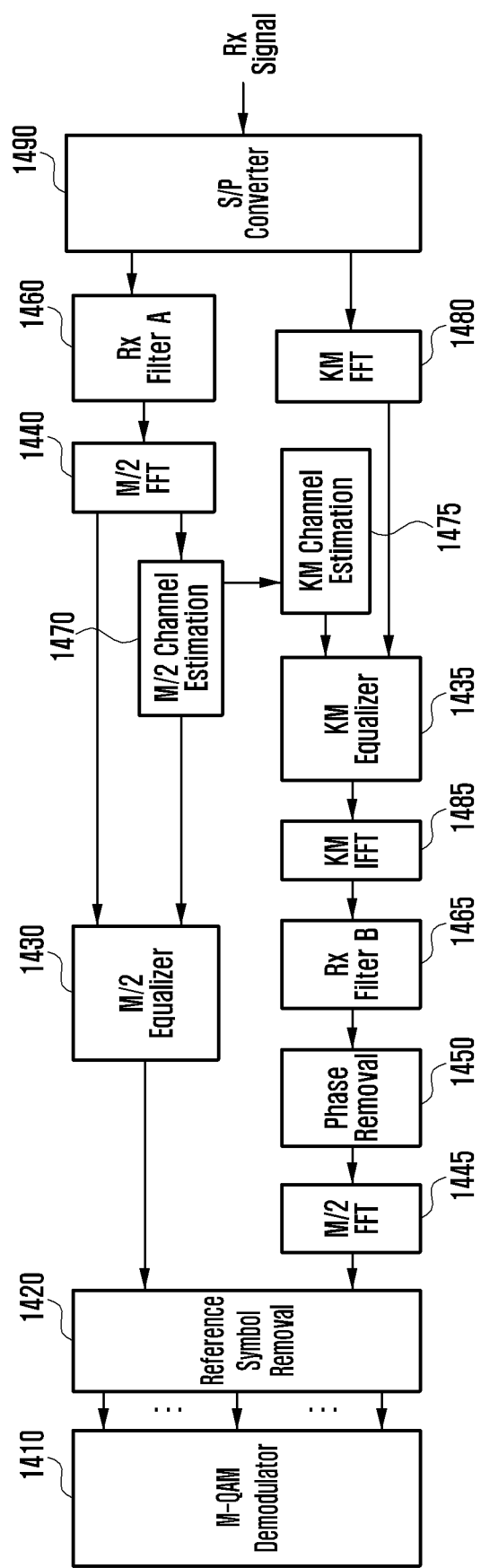
FIG. 14 illustrates realization of a receiver according to another embodiment of the present disclosure.

FIG. 14 illustrates realization of a receiver according to another embodiment of the present disclosure.

Referring to FIG. 14, the receiver may be realized based on time domain filter A 1460 and time domain filter B 1465. Here, filter A 1460 and filter B 1465 may exhibit a performance difference. That is, as described before, filter A 1460 may exhibit higher performance than filter B 1465. When the two filters exhibit different performance, it is necessary to provide different processing configurations for even and odd subcarriers.

When filter A 1460 exhibits higher performance, the transmitter may use an RS mapping scheme as shown in FIG. 4 to map reference symbols to even subcarriers for signal transmission. At the receiver, the received signal is fed to filter A 1460, and the filter A outputs are fed to FFT with size M/2 1440. Channel information for even subcarriers with RS mappings is estimated, and channel information for the remaining even subcarriers is estimated through interpolation, so that channel information for the even (M/2) subcarriers may be estimated 1470. Here, due to robust characteristics of filter A 1460, frequency domain even channels estimated through filter A 1460 may exhibit frequency responses similar to those of real physical channels with zero noise.

The channel information with size M/2 for the even subcarriers is used to estimate 1475 channel information with size KM for the odd subcarriers.

To detect data mapped to the even and odd subcarriers using channel information with size M/2 and channel information with size KM, an equalizer 1430 of size M/2 and an equalizer 1435 of size M are applied.

Here, equalization for data detection on even subcarriers is applied after application of filter A 1460 and FFT 1440 with size M/2. Equalization for data detection on odd subcarriers is applied after application of FFT 1480 with size KM and before application of filter B 1465. That is, data mapped to the odd subcarriers may be detected by applying a series of operations including equalization 1435 with size KM, IFFT 1485 with size KM, time-domain filtering with filter B 1465, phase removal 1450, and FFT 1445 with size M/2. Thereafter, reference symbols are removed 1420 before M-QAM demodulation 1410.

Figure 15:
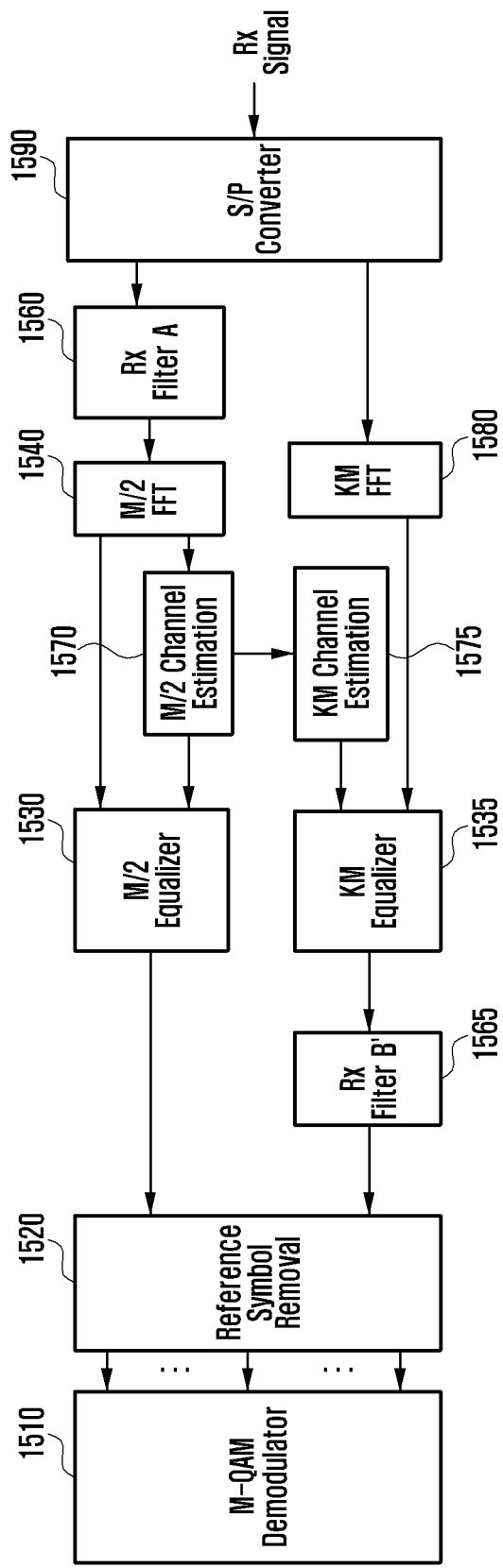
FIG. 15 illustrates realization of a receiver according to another embodiment of the present disclosure.

FIG. 15 illustrates realization of a receiver according to another embodiment of the present disclosure.

Referring to FIG. 15, the receiver may be realized based on time domain filter A 1560 and frequency domain filter B' 1565. Here, filter A 1560 and filter B' 1565 may exhibit a performance difference. That is, as described before, filter A 1560 may exhibit higher performance than filter B' 1565.

The processing structure from signal reception to equalization with size M/2 and equalization with size KM is similar to that in the embodiment of FIG. 14. In particular, elements 1510, 1520, 1530, 1540, 1570, 1575, 1580, and 1590 of FIG. 15 are similar to elements 1410, 1420, 1430, 1440, 1470, 1475, 1480, and 1490 of FIG. 14 and thus descriptions thereof are omitted herein for conciseness.

As filter B' 1565 is a frequency domain filter, filter B' 1565 is used after equalization 1535 with size KM to detect data mapped to odd subcarriers. Compared with the embodiment of FIG. 14, to detect data mapped to odd subcarriers, equalization 1535 with size KM and filtering with filter B' 1565 are applied without application of IFFT with size KM. After frequency domain filtering with filter B' 1565, FFT with size M/2 may be not applied either.

Figure 16:
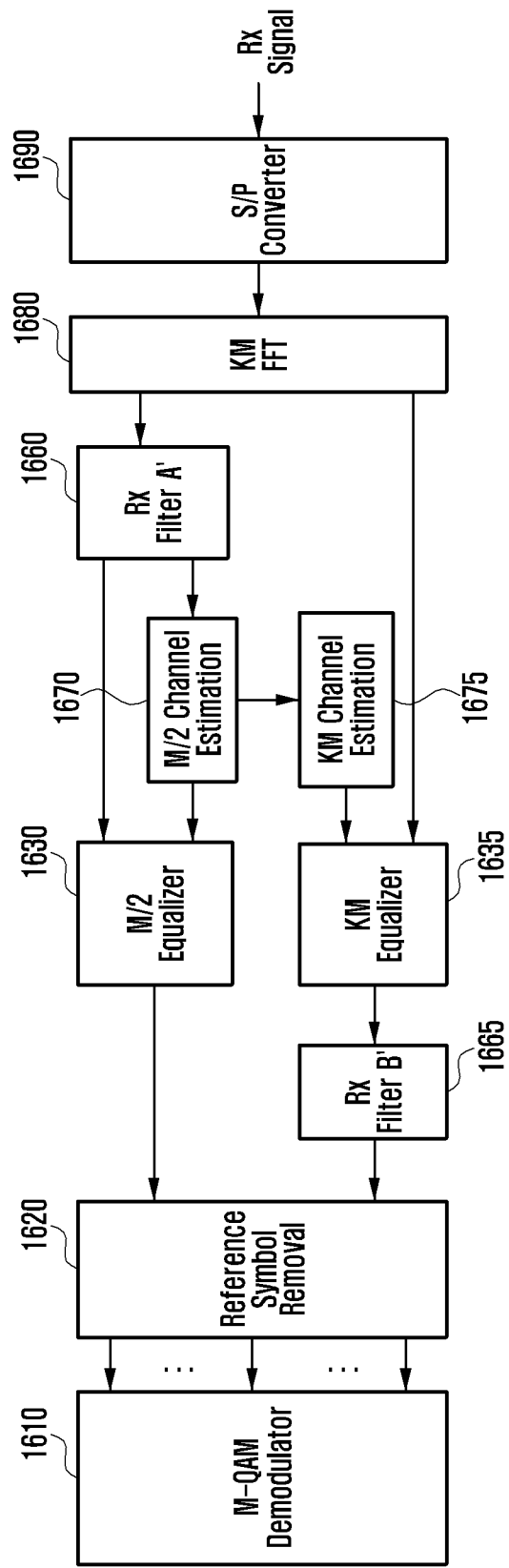
FIG. 16 illustrates realization of a receiver according to another embodiment of the present disclosure.

FIG. 16 illustrates realization of a receiver according to another embodiment of the present disclosure.

Referring to FIG. 16, the receiver may be realized based on frequency domain filter A' 1660 and frequency domain filter B' 1665. Here, filter A' 1660 and filter B' 1665 may exhibit a performance difference. That is, as described before, filter A' 1660 may exhibit higher performance than filter B' 1665.

At the receiver, FFT 1680 with size KM is applied to the signal received from serial/parallel (S/P) converter 1690 and frequency domain filter A' 1660 is applied to the FFT outputs. Channel information for subcarriers with RS mappings is estimated, and channel information for the remaining even subcarriers is estimated through interpolation, so that channel information with size M/2 for the even subcarriers is estimated 1670.

Channel information with size KM for the odd subcarriers is estimated 1675 using the channel information with size M/2 for the even subcarriers.

To detect data mapped to the even and odd subcarriers using the channel information with size M/2 and the channel information with size KM, an equalizer 1630 of size M/2 and an equalizer 1635 of size KM are applied.

Signal processing after equalization with size M/2 and equalization with size KM is similar to that in the embodiment of FIG. 15. That is, reference symbols are removed 1620 before M-QAM demodulation 1610.

Figure 17:
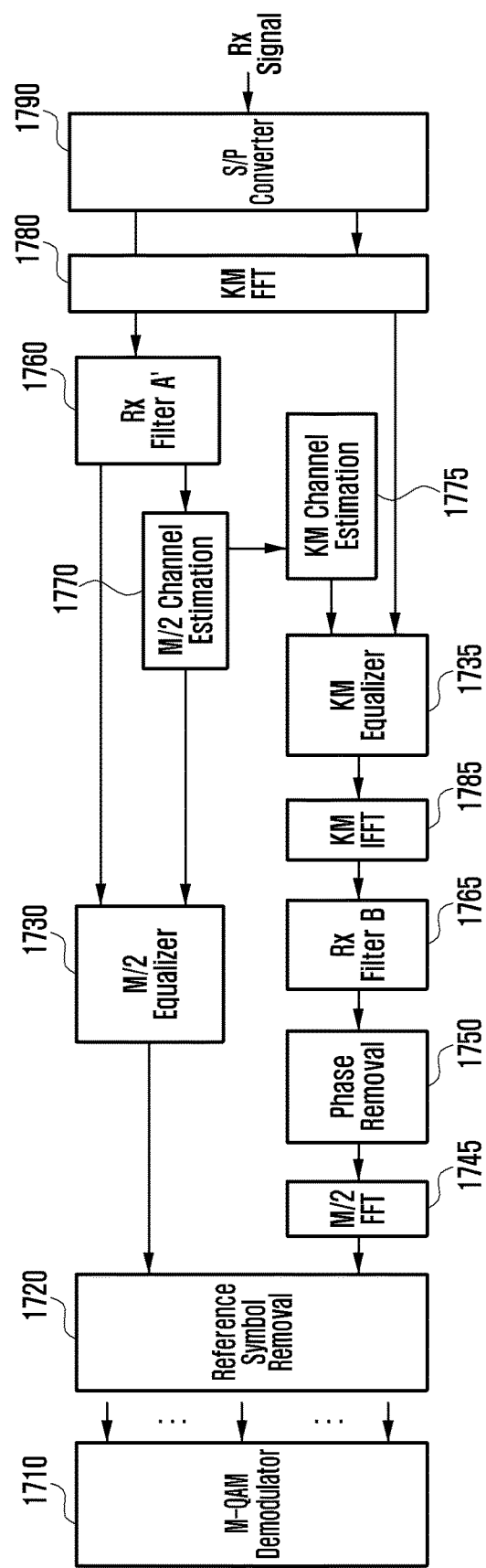
FIG. 17 illustrates realization of a receiver according to another embodiment of the present disclosure.

FIG. 17 illustrates realization of a receiver according to another embodiment of the present disclosure.

Referring to FIG. 17, the receiver may be realized based on frequency domain filter A' 1760 and time domain filter B 1765. Here, filter A' 1760 and filter B 1765 may exhibit a performance difference. That is, as described before, filter A' 1760 may exhibit higher performance than filter B 1765.

The processing structure from signal reception to equalization with size M/2 and equalization with size KM is similar to that in the embodiment of FIG. 16. In particular, elements 1710, 1720, 1730, 1770, 1775, 1780, and 1790 of FIG. 17 are similar to elements 1610, 1620, 1630, 1670, 1675, 1680, and 1690 of FIG. 14 and thus descriptions thereof are omitted herein for conciseness. Thereafter, data mapped to odd subcarriers may be detected by applying a series of operations including equalization 1735 with size KM, IFFT 1785 with size KM, time-domain filtering with filter B 1765, phase removal 1750, and FFT 1745 with size M/2.

Hereinabove, a description is given of receiver operation according to an embodiment of the present disclosure.

Next, a description is given of channel derivation for odd subcarriers when receiver filter A exhibits higher performance.

Figure 18:
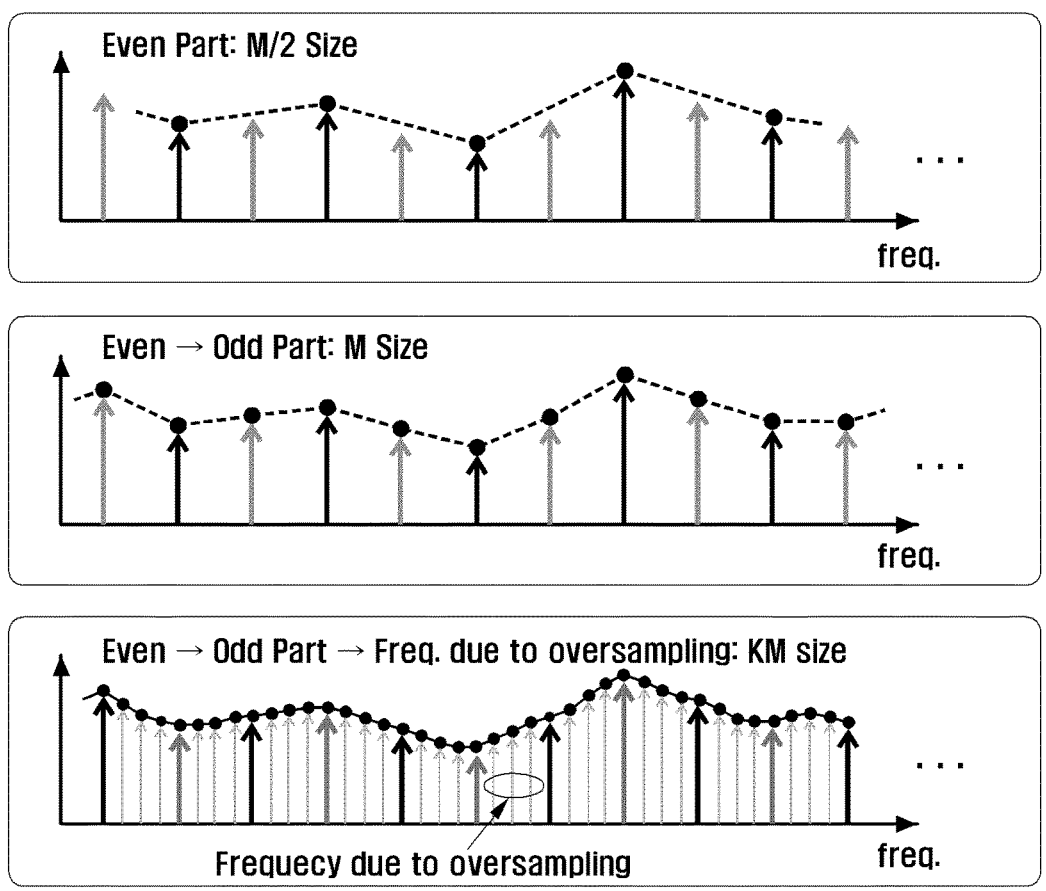
FIG. 18 illustrates odd channel derivation through interpolation from even channel information with a size of M/2 according to an embodiment of the present disclosure.

FIG. 18 illustrates odd channel derivation through interpolation from even channel information with size M/2 according to an embodiment of the present disclosure.

Referring to FIG. 18, even channels with size M/2 can be interpolated to channels with size M including odd channels, which can be further interpolated to channels with size KM. That is, at the receiver, channel information of subcarriers with RS mappings may be estimated by using RSs mapped to even subcarriers associated with filter A. The channel information of even subcarriers with RS mappings may be interpolated to channel information of the remaining even subcarriers, producing channel information with size M/2 for even subcarriers. The channel information with size M/2 for even subcarriers may be used to estimate channel information for odd subcarriers, deriving channels with size M. Then, the channels with size M may be interpolated to channels with size KM.

Figure 19:
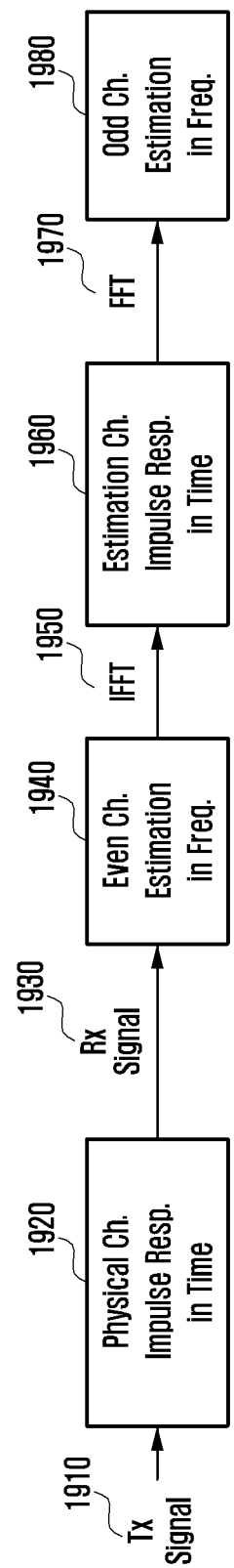
FIG. 19 illustrates odd channel derivation through inverse fast fourier transform (IFFT)/fast fourier transform (FFT) from even channel information with a size of M/2 according to an embodiment of the present disclosure.

FIG. 19 illustrates odd channel derivation through IFFT/FFT from even channel information with size M/2 according to an embodiment of the present disclosure.

Referring to FIG. 19, the transmit signal 1910 passing though the physical channel indicated by physical channel impulse response in time 1920 is received as a receive signal 1930 by the receiver. Based on the receive signal 1930, even channel estimation 1940 with size M/2 is performed. IFFT 1950 with size M/2 is applied to the even channel estimation output, producing estimation of impulse response in time 1960. FFT 1970 is applied to the estimated impulse response in time 1960, producing derivation of odd channel estimation in frequency 1980.

Hereinabove, a description is given of channel derivation for odd subcarriers when receiver filter A exhibits higher performance.

Figure 20:
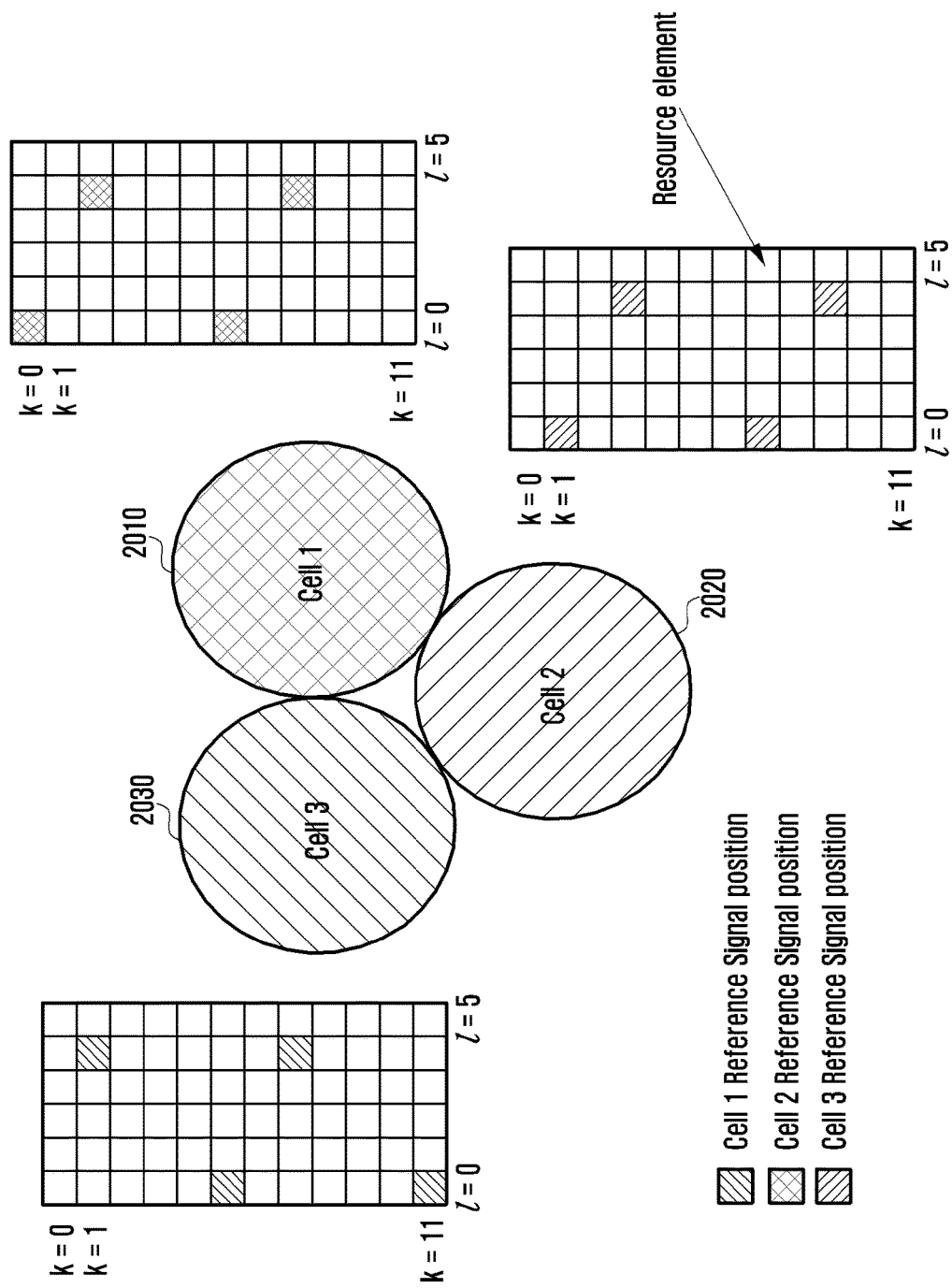
FIG. 20 illustrates a structure of subcarrier-reference symbol mappings for channel estimation in a multi-cell environment according to an embodiment of the present disclosure.

FIG. 20 illustrates a structure of subcarrier-reference symbol mappings for channel estimation in a multi-cell environment according to an embodiment of the present disclosure.

Referring to FIG. 20, for cell 1 (or first cell), among two base filters (filter A0 and filter B0), when it is assumed that filter A0 exhibits higher performance than filter B0 as described before, reference symbols may be mapped to even subcarriers. That is, even subcarriers are mapped with a filter bank having filter A0 as base filter, and odd subcarriers are mapped with a filter bank having filter B0 as base filter. In this case, when the control channel or a filter set common to CRSs (one filter set includes at least two base filters) is determined for each cell, frequency mapping schemes may be determined in advance. Considering the LTE system where a frequency shift is applied according to cell ID during CRS mapping to prevent degradation of channel estimation due to inter-cell interference, when the above embodiments usable for a single cell case are directly applied to an extended multi-cell scenario of LTE, as reference symbols are mapped to either even subcarriers or odd subcarriers in accordance with two base filters, one frequency shift for multiple cells results in a two-subcarrier shift. In particular, when two or more base filters are used and one base filter is usable for RS mapping, a frequency shift per cell uses a spacing of $N_B$ resource elements ($N_B$ is the number of base filters). In this case, even $N_B=3$ may indicate that only two frequency shift patterns are possible. For reference, six frequency shift patterns are possible in the LTE system.

To solve the above problem, in one embodiment of the present disclosure, while shifting in CRS positions is performed in the same manner as the LTE system, modulo shifting may be applied to the filter banks mapped with physical subcarriers. For example, referring to FIG. 20, assuming that two common base filters are used, for cell 1 2010, even subcarriers are mapped to the filter bank including filter A0. In this case, the filters may be mapped in a sequence of A0B0A1B1A2B2 .... Here, A1 indicates a sibling filter of filter A0 corresponding to filter A0 shifted by two subcarriers, and B1 indicates a sibling filter of filter B0 corresponding to filter B0 shifted by two subcarriers. For cell 2 2020 and cell 3 2030, it is necessary to have a CRS-filter mapping indicator indicating that odd subcarriers are mapped to the filter bank including filter A0. Here, filter banks may be shifted according to CRS shifting and the number of base filters. That is, the filters may be mapped in a sequence of B0A0B1A1B2A2 .... Hence, when reference symbols are mapped to one of two base filters with higher performance, one CRS shift in frequency may correspond to filter bank shifting in modulo-2.

For reference symbols specific to individual users like demodulation reference signal (DMRS) in LTE, the base filter mapping in the frequency domain may be determined according to base filter selection as described above, and reference symbol positions may be arranged so that reference symbols are mapped to the base filter with higher performance. In another embodiment, assuming that reference symbol positions are fixed, when two or more base filters are used in resource blocks assigned to one user, it may be necessary to have an indicator indicating physical subcarriers so that reference symbols are mapped to the filter with higher performance.

In the above embodiments, only two base filters are used for ease of description. However, in the QAM-FBMC system, two or more base filters, i.e., $N_B$ filter banks, may be configured, and reference symbols may be mapped to $N_k$ filter banks with higher-performance base filters. For example, when $N_B=4$ and $N_k=2$, as described before, filter comparison may be performed in terms of autocorrelation and cross-correlation with respect to time domain delay. However, when the number of base filters becomes large, performance of filter comparison is not easy owing to multiple parameters. Instead, when τ is a multiple of M (number of data), the self signal to interference ratio (SIR) may be obtained from autocorrelation and cross-correlation. Additionally, the change of the correlation function due to τ is associated with confinement characteristics of the filter. As such, the criterion to select a high-performance filter may be represented as Equation 8 below.

$$\alpha 1/\text{SIR}(P,P_g) + (1-\alpha)\text{Confinement}(P,P_B) \quad \text{Equation 8}$$

Here, P indicates a set of M filters formed based on $N_B$ base filters. High-performance filters may be selected based on SIR and confinement of a filter bank with base filter $P_B$. The self SIR for a base filter working on an ideal channel may be determined according to interference caused by other filters and sibling filters of the base filter. When a filter set is determined, the self SIR may have different vales for different base filters. When a filter set is determined, confinement may also have different vales for different base filters. The parameter α weighing either confinement or self SIR is a channel-dependent value. That is, α is close to zero for a frequency or time selective channel, weighing on confinement; and α is close to 1 for a flat channel in the frequency or time domain. In other words, base filters may be sorted in decreasing order in terms of the result of Equation 8, and reference symbols may be mapped to $N_K$ base filters among the base filters.

Hereinabove, a description is given of reference signal mappings in a multi-cell environment.

Figure 21:
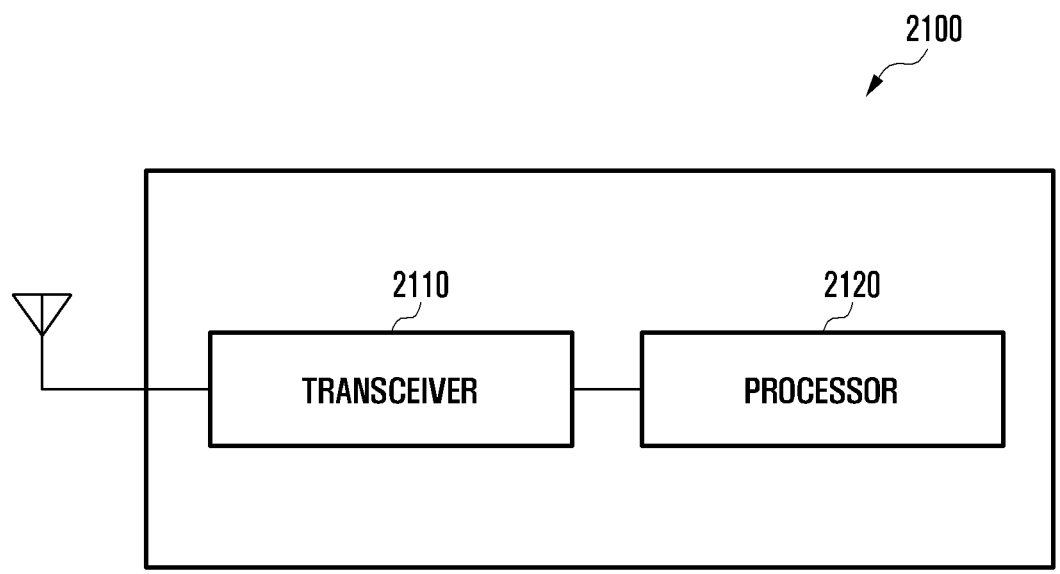
FIG. 21 illustrates a structure of a transmitter according to an embodiment of the present disclosure.

FIG. 21 illustrates a structure of a transmitter according to an embodiment of the present disclosure. The transmitter 2100 may include a transceiver 2110 and a processor 2120 controlling the overall operation of the transmitter 2100.

The processor 2120 controls the transmitter 2100 to perform an operation according to one of the above embodiments. For example, the processor 2120 may control a process of determining whether a performance difference is present between a first transmitting filter and a second transmitting filter; mapping reference symbols evenly to subcarriers associated with the first transmitting filter and subcarriers associated with the second transmitting filter when no performance difference is present between the first transmitting filter and the second transmitting filter; mapping reference symbols preferentially to subcarriers associated with the higher-performance transmitting filter when a performance difference is present between the first transmitting filter and the second transmitting filter; and sending a transmit signal having the mapped reference symbols.

The transceiver 2110 sends and receives signals according to one of the above embodiments. For example, the transceiver 2110 may send a transmit signal having mapped reference symbols to the receiver. The transceiver 2110 may receive channel related information from the receiver.

Figure 22:
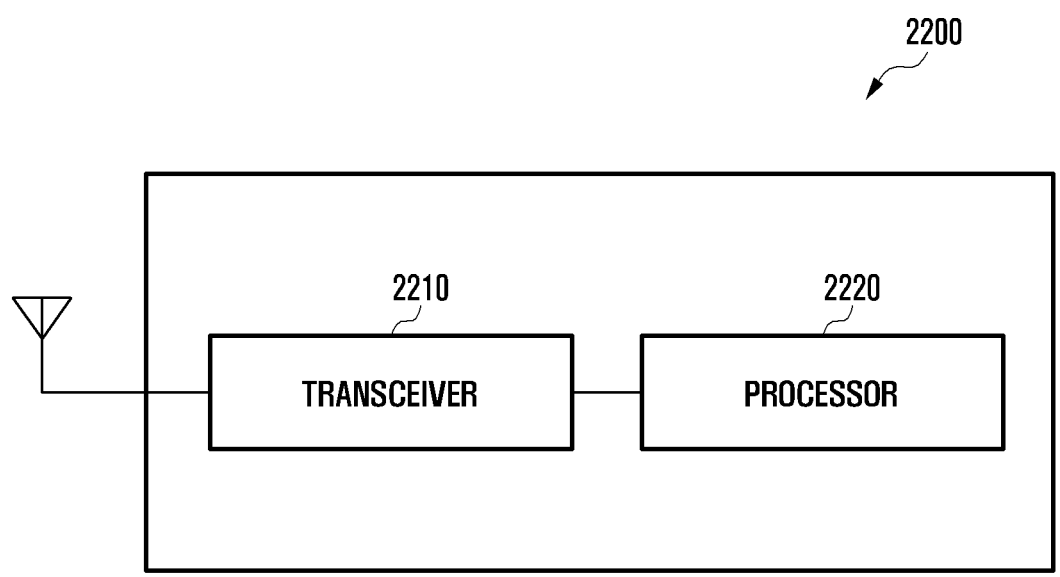
FIG. 22 illustrates a structure of a receiver according to an embodiment of the present disclosure.

FIG. 22 illustrates a structure of a receiver according to an embodiment of the present disclosure. The receiver 2200 may include a transceiver 2210 and a processor 2220 controlling the overall operation of the receiver 2200.

The processor 2220 controls the receiver 2200 to perform an operation according to one of the above embodiments. For example, the processor 2220 may control a process of determining whether a performance difference is present between a first receiving filter and a second receiving filter; estimating, when a performance difference is present between the first receiving filter and the second receiving filter, channel information of subcarriers associated with the higher-performance receiving filter; deriving channel information of subcarriers associated with the lower-performance receiving filter by utilizing the estimated channel information, and performing signal detection by use of the estimated channel information and derived channel information.

The transceiver 2210 sends and receives signals according to one of the above embodiments. For example, the transceiver 2210 may receive a transmit signal having mapped reference symbols from the transmitter. The transceiver 2210 may send channel related information to the transmitter.

While the present disclosure has been shown and described with reference to various embodiments thereof, it should be understood by those skilled in the art that many variations and modifications of the method and apparatus described herein will still fall within the spirit and scope of the present disclosure as defined in the appended claims and their equivalents.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method for signal transmission in a transmitter, the method comprising:
   transmitting, to a receiver, channel measurement information;
   receiving, from the receiver, information related to channel based on the channel measurement information;
   selecting a first filter and a second filter to be used for signal transmission according to the received information related to channel;
   mapping, if no performance difference is present between the first filter and the second filter, reference symbols evenly to subcarriers associated with the first filter and subcarriers associated with the second filter;
   mapping, if a performance difference is present between the first filter and the second filter, reference symbols preferentially to subcarriers associated with the transmitting filter with higher performance; and
   transmitting a transmit signal having the mapped reference symbols.

2. The method of claim 1, further comprising determining whether the performance difference between the first filter and the second filter is greater than or equal to a preset threshold.

3. The method of claim 1, further comprising determining whether the first filter and the second filter differ in terms of at least one of an amount of change and orthogonal robustness with respect to time domain delay.

4. The method of claim 1, further comprising determining whether the first filter and the second filter differ in terms of filter coefficients.

5. The method of claim 1, wherein the selecting of the first filter and the second filter comprises:
   setting an information metric after analysis of the information related to channel received from the receiver;
   determining information on the first filter and the second filter to be used for signal transmission based on the information metric; and
   transmitting the information on the first filter and the second filter to the receiver.

6. The method of claim 5, wherein the information related to channel from the receiver comprises information regarding one or more of mobility, channel selectivity, location, and delay profile of the receiver.

7. The method of claim 5, wherein the determining of the information on the first filter and the second filter comprises:
   determining whether a change between a previous information metric and a currently set information metric is greater than or equal to a preset threshold;
   selecting the first filter and the second filter according to the set information metric if the change in the information metric is greater than or equal to the threshold; and
   maintaining the existing first filter and the second filter if the change in the information metric is less than the threshold.

8. A method for signal reception in a receiver, the method comprising:
   receiving, from a transmitter, channel measurement information;
   acquiring information related to channel based on the received channel measurement information;
   transmitting, to the transmitter, the acquired information related to channel;
   receiving, from the transmitter, information on a first filter and a second filter to be used for signal reception based on the acquired information related to channel;
   estimating, if a performance difference is present between the first filter and the second filter, channel information of subcarriers associated with the filter having higher performance among the first filter and the second filter;
   determining channel information of subcarriers associated with the filter having lower performance by utilizing the estimated channel information; and
   detecting signal based on the estimated channel information and derived determined channel information.

9. The method of claim 8, further comprising estimating channel information of subcarriers associated with the first filter and estimating channel information of subcarriers associated with the second filter if no performance difference is present between the first filter and the second filter.

10. The method of claim 8, wherein the estimating of the channel information comprises:
    estimating channel information of subcarriers having a mapped reference symbol by utilizing the higher-performance filter among the first filter and the second filter; and
    estimating channel information of subcarriers without a mapped reference symbol among the subcarriers associated with the higher-performance filter based on interpolation.

11. The method of claim 8, further comprising determining whether the first filter and the second filter differ in terms of at least one of an amount of change and orthogonal robustness with respect to time domain delay.

12. The method of claim 8, further comprising determining whether the first filter and the second filter differ in terms of filter coefficients.

13. The method of claim 8, further comprising determining whether the performance difference between the first filter and the second filter is greater than or equal to a preset threshold.

14. The method of claim 8, wherein the information related to channel comprises information regarding one or more of mobility, channel selectivity, location, and delay profile of the receiver.

15. A transmitter comprising:
a transceiver configured to transmit and receive signals; and
at least one processor configured to:
receive, from the receiver, information related to channel based on the channel measurement information,
select a first filter and a second filter to be used for signal transmission according to the received information related to channel,
map, if no performance difference is present between the first filter and the second filter, reference symbols evenly to subcarriers associated with the first filter and subcarriers associated with the second filter,
map, if a performance difference is present between the first filter and the second filter, reference symbols preferentially to subcarriers associated with the transmitting filter with higher performance, and
transmit a transmit signal having the mapped reference symbols.

16. The transmitter of claim 15, wherein the at least one processor is configured to determine whether the performance difference between the first filter and the second filter is greater than or equal to a preset threshold.

17. The transmitter of claim 15, wherein the at least one processor is configured to determine whether the first filter and the second filter differ in terms of at least one of an amount of change and orthogonal robustness with respect to time domain delay.

18. The transmitter of claim 17, wherein the at least one processor is configured to determine whether the first filter and the second filter differ in terms of filter coefficients.

19. The transmitter of claim 15, wherein the at least one processor is configured to set an information metric after analysis of the information related to channel received from the receiver, determining information on the first filter and the second filter to be used for signal transmission based on the information metric, and transmit the information on the first filter and the second filter to the receiver.

20. The transmitter of claim 19, wherein the information related to channel from the receiver comprises information regarding one or more of mobility, channel selectivity, location, and delay profile of the receiver.

21. The transmitter of claim 19, wherein the at least one processor is configured to determine whether a change between a previous information metric and a currently set information metric is greater than or equal to a preset threshold, selecting the first filter and the second filter according to the currently set information metric if the change in the information metric is greater than or equal to the threshold, and maintaining the existing first filter and the second filter if the change in the information metric is less than the threshold.

22. A receiver comprising:
a transceiver to transmit and receive signals; and
at least one processor configured to:
receive, from a transmitter, channel measurement information,
acquire information related to channel based on the received channel measurement information,
transmit, to the transmitter, the acquired information related to channel to the transmitter,
receive, from the transmitter, information on a first filter and a second filter to be used for signal reception based on the acquired information related to channel,
estimate, if a performance difference is present between the first filter and the second filter, channel information of subcarriers associated with the filter having higher performance among the first filter and the second filter,
determine channel information of subcarriers associated with the filter having lower performance by utilizing the estimated channel information, and
detect signal based on the estimated channel information and determined channel information.

23. The receiver of claim 22, wherein, if no performance difference is present between the first filter and the second filter, the at least one processor is configured to estimate channel information of subcarriers associated with the first filter and to estimate channel information of subcarriers associated with the second filter.

24. The receiver of claim 22, wherein the at least one processor is configured to estimate channel information of subcarriers having a mapped reference symbol by utilizing the higher-performance filter among the first filter and the second filter, and to estimate channel information of subcarriers without a mapped reference symbol among the subcarriers associated with the higher-performance filter by based on interpolation.

25. The receiver of claim 22, wherein the at least one processor is configured to determine whether the first filter and the second filter differ in terms of at least one of an amount of change and orthogonal robustness with respect to time domain delay.

26. The receiver of claim 22, wherein the at least one processor is configured to determine whether the first filter and the second filter differ in terms of filter coefficients.

27. The receiver of claim 22, wherein the at least one processor is configured to determine whether the performance difference between the first filter and the second filter is greater than or equal to a preset threshold.

28. The receiver of claim 22, wherein the information related to channel comprises information regarding one or more of mobility, channel selectivity, location, and delay profile of the receiver.

* * * * *